US012026948B2

(12) United States Patent
Seleskerov et al.

(10) Patent No.: US 12,026,948 B2
(45) Date of Patent: Jul. 2, 2024

(54) TECHNIQUES FOR PRESENTATION ANALYSIS BASED ON AUDIENCE FEEDBACK, REACTIONS, AND GESTURES

(71) Applicant: Microsoft Technology Licensing, LLC, Redmond, WA (US)

(72) Inventors: Konstantin Seleskerov, Palo Alto, CA (US); Amit Srivastava, San Jose, CA (US); Derek Martin Johnson, Sunnyvale, CA (US); Priyanka Vikram Sinha, Sunnyvale, CA (US); Gencheng Wu, Campbell, CA (US); Brittany Elizabeth Mederos, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 838 days.

(21) Appl. No.: 17/085,755

(22) Filed: Oct. 30, 2020

(65) Prior Publication Data

US 2022/0138470 A1 May 5, 2022

(51) Int. Cl.
*G06V 20/40* (2022.01)
*G06N 20/00* (2019.01)
(Continued)

(52) U.S. Cl.
CPC .............. *G06V 20/41* (2022.01); *G06N 20/00* (2019.01); *G06V 20/46* (2022.01); *G06V 40/176* (2022.01); *G06V 40/23* (2022.01)

(58) Field of Classification Search
CPC ........ G06V 40/20; G06V 20/41; G06V 40/28; G06V 40/174; H04N 7/152; H04N 7/147; G10L 25/63; G06F 2203/011
See application file for complete search history.

(56) References Cited

U.S. PATENT DOCUMENTS 9,336,268 B1 5/2016 Moudy et al.
9,398,259 B2 7/2016 Breedvelt-Schouten et al.
(Continued)

OTHER PUBLICATIONS

"International Search Report and Written Opinion Issued in PCT Application No. PCT/US21/045460", dated Nov. 2, 2021, 11 Pages.
(Continued)

*Primary Examiner* — Emily C Terrell
*Assistant Examiner* — Stefano Anthony Dardano
(74) *Attorney, Agent, or Firm* — NovoTechIP International PLLC

(57) ABSTRACT

Techniques performed by a data processing system include establishing an online presentation session for conducting an online presentation, receiving first media streams comprising presentation content from the first computing device, receiving second media streams from the second computing devices of a subset of the plurality of participants, the second media streams including audio content, video content, or both of the subset of the plurality of participants, analyzing the first media streams using first machine learning models to generate feedback results, analyzing the set of second media streams to identify first reactions by the participants to obtain reaction information, automatically analyzing the feedback results and the reactions to identify discrepancies between the feedback results and the reactions, and automatically updating one or more parameters of the machine learning models based on the discrepancies to improve the suggestions for improving the online presentation.

14 Claims, 16 Drawing Sheets

(51) Int. Cl.
*G06V 40/16* (2022.01)
*G06V 40/20* (2022.01)

(56) References Cited

U.S. PATENT DOCUMENTS

| | | | |
|---|---|---|---|
| 9,843,768 B1 | 12/2017 | Negi et al. | |
| 10,176,365 B1 | 1/2019 | Ramanarayanan et al. | |
| 10,382,722 B1 | 8/2019 | Peters et al. | |
| 10,708,659 B2 * | 7/2020 | Meredith | H04N 21/252 |
| 10,757,367 B1 * | 8/2020 | Peters | H04N 7/152 |
| 2016/0057391 A1 | 2/2016 | Block et al. | |
| 2016/0070678 A1 | 3/2016 | Kidron et al. | |
| 2016/0274764 A1 | 9/2016 | Moreau et al. | |
| 2016/0307347 A1 | 10/2016 | Matteson et al. | |
| 2017/0171614 A1 | 6/2017 | El Kaliouby et al. | |
| 2018/0359530 A1 | 12/2018 | Marlow et al. | |
| 2019/0102802 A1 * | 4/2019 | Tuschman | G06N 20/20 |
| 2019/0197357 A1 | 6/2019 | Anderson et al. | |
| 2019/0212811 A1 * | 7/2019 | Moncomble | A61B 5/4803 |
| 2020/0021453 A1 | 1/2020 | Advani et al. | |
| 2020/0202125 A1 * | 6/2020 | Feng | G06V 40/23 |
| 2020/0228359 A1 | 7/2020 | El Kaliouby et al. | |
| 2020/0244380 A1 | 7/2020 | Agrawal et al. | |
| 2020/0288206 A1 | 9/2020 | Bist et al. | |
| 2020/0320478 A1 | 10/2020 | Crawford et al. | |
| 2020/0349429 A1 * | 11/2020 | Vendrow | H04N 7/15 |
| 2021/0076002 A1 | 3/2021 | Peters et al. | |
| 2022/0141532 A1 | 5/2022 | Li et al. | |

OTHER PUBLICATIONS

"International Search Report and Written Opinion Issued in PCT Application No. PCT/US21/048574", dated Dec. 8, 2021, 12 Pages.

"Final Office Action Issued in U.S. Appl. No. 17/085,813", dated Dec. 7, 2021, 23 Pages.

"Non Final Office Action Issued in U.S. Appl. No. 17/085,813", dated Apr. 1, 2022, 26 Pages.

"Non Final Office Action Issued in U.S. Appl. No. 17/085,813", dated May 19, 2021, 18 Pages.

"Final Office Action Issued in U.S. Appl. No. 17/085,813", dated Nov. 14, 2022, 26 Pages.

* cited by examiner

Create an Audience Poll

Great job on your presentation "Sales Analysis Review" on March 11, 2020.

Poll Question: Should we keep the same sales goals for next quarter?

Poll Answers:

[1] Yes

[2] No

[ Save Poll ]  [ Launch Poll ]  [ Close ]

Should we keep the same sales goals for next quarter?

◉ Yes

◎ No

[ Submit ]  [ Close ]

Poll Results

Should we keep the same sales goals for next quarter?

Total number of responses: 20

Yes ▇▇▇▇▇▇▇▇▇▇▇▇▇▇▇░░░░  15

No  ▇▇▇▇▇░░░░░░░░░░░░░░░  5

[ Close ]

TECHNIQUES FOR PRESENTATION ANALYSIS BASED ON AUDIENCE FEEDBACK, REACTIONS, AND GESTURES

BACKGROUND

Many workplaces, schools, universities, and other organizations which may traditionally conduct in-person meetings, classes, and/or presentations have had to quickly adapt to remote presentations. Workplaces may conduct meetings and/or presentations with colleagues and/or clients via remote videoconferencing and/or collaboration platforms. Teachers and professors may conduct classes using similar technologies which allow the teachers and professors to present lectures and/or interact with their students via a virtual classroom setting provided by a remote videoconferencing and/or collaboration platform.

With an in-person meeting, the presenter can readily interact with audience members to ask questions, answer questions, and/or receive other user feedback. However, with a remote presentation and remote learning, the presenter may have a more difficult time engaging with the audience due to the lack of direct interaction with the audience. Hence, there is a need for improved systems and methods that provide a technical solution for solving the technical problem of how to improve such models for providing suggestions to users for improving their presentation skills and/or for improving their presentation content.

SUMMARY

An example data processing system according to the disclosure may include a processor and a computer-readable medium storing executable instructions. The instructions when executed cause the processor to perform operations including establishing an online presentation session for conducting an online presentation for a first computing device of a presenter and a plurality of second computing devices of a plurality of participants, receiving, via a network connection, a set of first media streams comprising presentation content from the first computing device of the presenter, receiving, via the network connection, a set of second media streams from the second computing devices of a first subset of the plurality of participants, the set of second media streams including audio content, video content, or both of a first subset of the plurality of participants captured by the respective second computing devices of the first subset of the plurality of participants, analyzing the set of first media streams using one or more first machine learning models trained to analyze audio content, video content, presentation materials, or a combination thereof to provide suggestions for improving the online presentation to generate a set of first feedback results, analyzing the set of second media streams using one or more second machine learning models to identify a set of first reactions by the first subset of the plurality of participants to obtain first reaction information, automatically analyzing the set of first feedback results and the set of first reactions to identify a first set of discrepancies between the set of first feedback results and the set of first reactions, and automatically updating one or more parameters of the one or more first machine learning models based on the first set of discrepancies to improve the suggestions for improving the online presentation.

An example method implemented in a data processing system for facilitating an online presentation session includes establishing the online presentation session for a first computing device of a presenter and a plurality of second computing devices of a plurality of participants, receiving, via a network connection, a set of first media streams comprising presentation content from the first computing device of the presenter, receiving, via the network connection, a set of second media streams from the second computing devices of a first subset of the plurality of participants, the set of second media streams including audio content, video content, or both of a first subset of the plurality of participants captured by the respective second computing devices of the first subset of the plurality of participants, analyzing the set of first media streams using one or more first machine learning models trained to analyze audio content, video content, presentation materials, or a combination thereof to provide suggestions for improving the online presentation to generate a set of first feedback results, analyzing the set of second media streams using one or more second machine learning models to identify a set of first reactions by the first subset of the plurality of participants to obtain first reaction information, automatically analyzing the set of first feedback results and the set of first reactions to identify a first set of discrepancies between the set of first feedback results and the set of first reactions, and automatically updating one or more parameters of the one or more first machine learning models based on the first set of discrepancies to improve the suggestions for improving the online presentation.

An example computer-readable storage medium on which are stored instructions. The instructions when executed cause a processor of a programmable device to perform functions of establishing an online presentation session for conducting an online presentation for a first computing device of a presenter and a plurality of second computing devices of a plurality of participants, receiving, via a network connection, a set of first media streams comprising presentation content from the first computing device of the presenter, receiving, via the network connection, a set of second media streams from the second computing devices of a first subset of the plurality of participants, the set of second media streams including audio content, video content, or both of a first subset of the plurality of participants captured by the respective second computing devices of the first subset of the plurality of participants, analyzing the set of first media streams using one or more first machine learning models trained to analyze audio content, video content, presentation materials, or a combination thereof to provide suggestions for improving the online presentation to generate a set of first feedback results, analyzing the set of second media streams using one or more second machine learning models to identify a set of first reactions by the first subset of the plurality of participants to obtain first reaction information, automatically analyzing the set of first feedback results and the set of first reactions to identify a first set of discrepancies between the set of first feedback results and the set of first reactions, and automatically updating one or more parameters of the one or more first machine learning models based on the first set of discrepancies to improve the suggestions for improving the online presentation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 12A is an example of a user interface for creating a live poll that may be rendered on a display of the client device of participants of a presentation or online communications session.

FIG. 12B is an example of a user interface for presenting a live poll to participants of a presentation or online communications session.

FIG. 12C is an example of a user interface for displaying results of a live poll that may be rendered on a display of the client device of the presenter.

DETAILED DESCRIPTION

Figure 1:
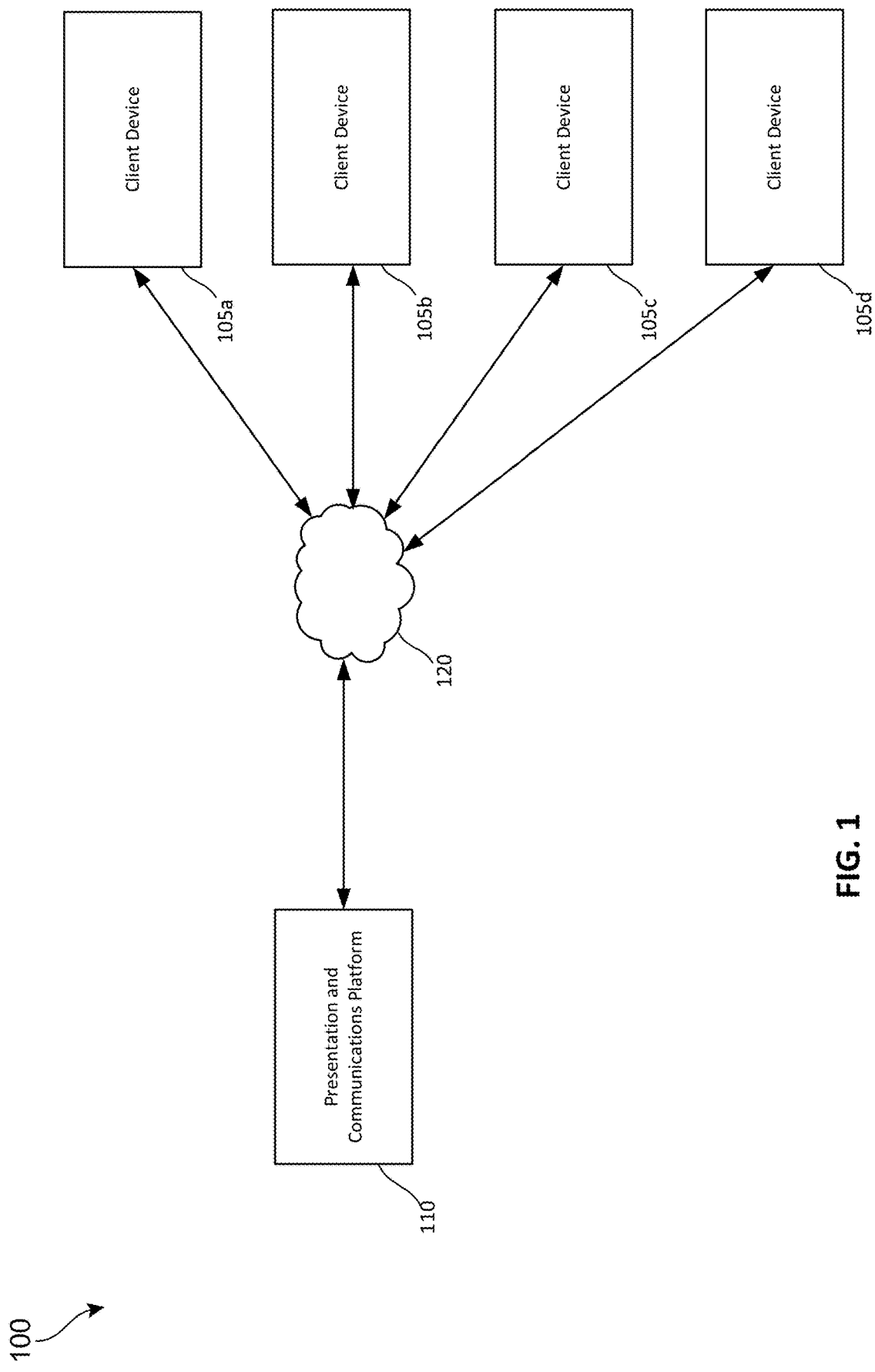
FIG. 1 is a diagram showing an example computing environment in which the techniques disclosed herein for a presentation and communications platform may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for improving the machine learning models for providing recommendations for improving presentation skills and/or for improving the design of presentation slides or other presentation content. These techniques provide a technical solution for solving the technical problem of how to improve such models for providing suggestions to users for improving their presentation skills and/or for improving their presentation content. These techniques may be used with an online presentation and/or communication session in which participants are located at different locations than that of the presenter and must interact with the presenter through their computing devices. Techniques are provided herein to facilitate express and/or implicit live user feedback from the participants to the presenter during the presentation or communications session and for analyzing this live user feedback to automatically improve the recommendations provided by the models. These techniques provide a technical benefit of mapping feedback information to a particular time within the presentation so that improvements may be made to the specific presentation skills and/or a particular slide associated with the feedback received. These and other technical benefits of the techniques disclosed herein will be evident from the discussion of the example implementations that follow.

The following terminology is used in the description. A "presentation" or "online presentation" as used herein refers to content that is be shared by a presenter with one or more participants. The online presentation content may include a slide show, document, video, images, and/or other content. The online presentation content may also include an audio discussion that accompanies the presentation content. The online presentation may be a standalone online presentation or may be part of an online communications session. A "presenter" as used herein refers to a user of a client device that is sharing an online presentation content with at least one participant. The presenter may be participant of an online communications session with other participants and may assume the role of presenter for at least a portion of the online communications session. A "participant" as used herein refers to a user who is part of the audience of the online presentation being shared by the presenter. An online presentation may include multiple participants, and the participants may be located remotely from the presenter. The participants may receive the online presentation content over a network connection at a client device with audiovisual capabilities for outputting the online presentation content to the participants.

FIG. 1 is a diagram showing an example computing environment 100 in which the techniques disclosed herein for a presentation and communications platform may be implemented. The computing environment 100 may include a presentation and communications platform 110. The example computing environment may also include a plurality of client devices, such as client devices 105a, 105b, 105c, and 105d. The client devices 105a, 105b, 105c, and 105d and the presentation and communications platform 110 may communicate via the network 120. Additional details of the presentation and communications platform 110 and client devices 105a, 105b, 105c, and 105d are discussed in greater detail with respect to FIG. 2.

The presentation and communications platform 110 may be implemented as a cloud-based service or set of services. The presentation and communications platform 110 may be configured to schedule and host online presentations, virtual meetings, video conferences, online collaboration sessions, and/or other online communications sessions in which at least a portion of the participants are located remotely from the presenter. The presentation and communications platform 110 may be used by companies, schools, universities, and other organizations which may traditionally conduct in-person meetings, classes, and/or presentations but must adapt to rapidly changing requirements in which many are working or attending school from home. The presentation and communications platform 110 provides services that enable the presenter to present content to remote participants and/or to facilitate a meeting that includes the remote participants. The presentation and communications platform 110 may also facilitate the collecting of feedback and response information from the participants of a presentation or communication session that may help the presenter to improve the content presented and/or the presenter's presentation techniques.

The presentation and communications platform 110 may receive live feedback from participants during an online presentation from the participants using the client devices 105b, 105c, and 105d to participate in the online presentation. As will be discussed in the examples that follow, the feedback may be express reactions or implicit reactions derived from user actions or behavior. The express reactions may be provided through user interface elements provided by the applications on the client devices 105b, 105c, and 105d used by the participants to receive and consume the presentation and/or communication session contents. The user interface elements may permit the participants to select reactions to be sent to the client device 105a of the presenter of the online presentation. The presentation and communications platform 110 may also be configured to recognize participant gestures and actions in audio and/or video streams captured by the client devices 105b, 105c, and 105d of the participants and sent to the presentation and communications platform 110.

The presentation and communications platform 110 may be implemented by a presentation platform, such as Microsoft PowerPoint Live, which enables a presenter to present a presentation online and to invite users to view the presentation on their own devices. The presentation and communications platform 110 may be implemented by a communications platform, such as Microsoft Teams, which provides an online hub for team collaboration including chat and video conferencing. A presenter may utilize such a communications platform to conduct a meeting, a lecture, conference, or other such event online in which participants may be able to communicate with the presenter as well as other participants via chat and audio and/or video conferencing. In such an online communications platform, a participant may serve as a presenter for part of an online communications session, while another participant may serve as a presenter for another part of the online communications session.

The client devices 105a, 105b, 105c, and 105d are computing devices that may be implemented as a portable electronic device, such as a mobile phone, a tablet computer, a laptop computer, a portable digital assistant device, a portable game console, and/or other such devices. The client devices 105a-105d may also be implemented in computing devices having other form factors, such as a vehicle onboard computing system, a video game console, a desktop computer, and/or other types of computing devices. Each of the client devices 105a-105d may have different capabilities based on the hardware and/or software configuration of the respective client device. While the example implementation illustrated in FIG. 1 includes four client devices, other implementations may include a different number of client devices.

Figure 2:
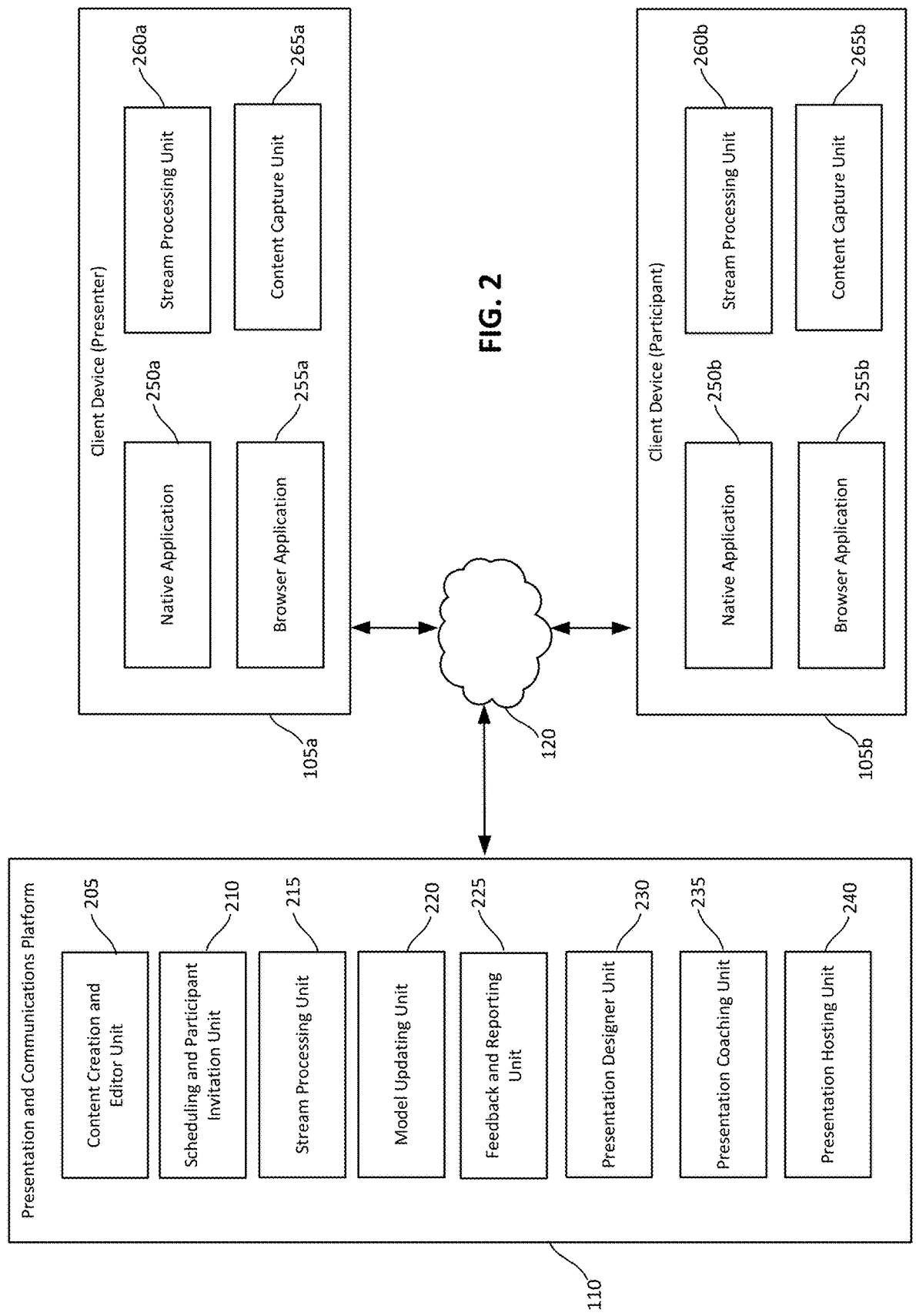
FIG. 2 is a diagram showing additional details of the presentation and communications platform and client devices of the computing environment shown in FIG. 1.

FIG. 2 is a diagram showing additional details of the presentation and communications platform and client devices of the computing environment shown in FIG. 1. The presentation and communications platform 110 may include a content creation and editor unit 205, a scheduling and participant invitation unit 210, a stream processing unit 215, a model updating unit 220, a feedback and reporting unit 225, a presentation designer unit 230, a presentation coaching unit 235, and a presentation hosting unit 240.

The presentation and communications platform 110 includes a hosting element provided by the presentation hosting unit 240 for hosting an online presentation in which participants may provide live feedback to the presenter during the presentation. The presentation and communications platform 110 also includes a coaching element providing by the presentation coaching unit 235 which may analyze the presentation provided by the presenter and provide feedback to the presenter for improving various aspects of the presentation. The presentation coaching unit 235 may also be used to rehearse the presentation without an audience to help the presenter hone their presentation skills and improve the presentation content prior to presenting to an audience. The presentation and communications platform 110 implements an architecture for efficiently analyzing audio, video, and/or multimodal media streams and/or presentation content. A technical benefit of this architecture is the media streams and/or presentation content may be analyzed to extract feature information for processing by the various models, and the high-level feature information output by the models may then be utilized by both the presentation coaching unit 235 and the presentation hosting unit 240. This approach provides a more efficient use of memory and processing resources on the data processing system hosting the presentation and communications platform 110 by eliminating the need to analyze content separately for the presentation coaching unit 235 and the presentation hosting unit 240.

The presentation hosting unit 240 may be configured to facilitate hosting of an online presentation by a presenter. The presentation hosting unit 240 may be configured to permit the presenter to share a presentation content with a plurality of participants. The presentation hosting unit 240 may be configured to engage with the audience by providing the audience with the ability to send reaction icons or emojis. Emojis are graphic symbols that represent an idea or concept that are used in a variety of messaging applications. Emojis may serve as a shortcut for conveying an idea in graphic form and are commonly used to react to a message. The presentation hosting unit 240 is configured to enable participants to an online presentation to send emoji feedback to the presenter during the online presentation and to present this feedback to the presenter in real time. The presentation hosting unit 240 may provide the presenter with configuration settings in which the presenter may control whether the feedback is visible only to the presenter or is visible to all the participants of the online presentation.

The presentation hosting unit 240 provides means for the participants to expressly or to implicitly generate emoji feedback to the presenter. A participant may expres sly generate reactions to the presentation by clicking on or otherwise activating a reaction icon or emoji representing the participant's reaction to the presentation. However, clicking on or otherwise activating a reaction icon is not the most natural way for participants to engage with the presenter. The presentation and communications platform 110 provides an additional means for the participants to engage with the presenter. The participants may engage with the presenter by providing more natural reactions to the presentation content, such as a thumbs up or thumbs down gesture, smiling, laughing, shaking their head or nodding, yawning, and/or other actions in response to the presentation content. The client devices 105*b*, 105*c*, and 105*d* of the participants may be configured to capture audio and/or video streams of the participants while the presentation is underway. The presentation and communications platform 110 may receive and analyze these streams using machine learning models to identify these user actions and to map these to reaction icons or emojis that may automatically be shown to the presenter during the online presentation. In some implementations, the reaction icons or emojis may be rendered over the presentation content being shared by the presenter by the client device 105*a* of the presenter and/or by the client devices 105*b*, 105*c*, and 105*d* of the participants if the presenter has chosen to share the reactions with participants. The reaction icons or emojis may be rendered over the presentation content or otherwise rendered on a display of the client device. The reaction icons or emojis may appear as an animation that appears briefly before fading away. Using this latter method of analyzing the participant actions to generate reactions to the online presentation may promote user engagement by providing a more natural means for interacting with the online presentation. This approach may also provide more information that the presenter may be able to use to better understand audience engagement than may otherwise be available. Participants may not be inclined to react to the online presentation if they must select an appropriate reaction from a list of available reactions and click on that reaction. The techniques disclosed herein may provide valuable additional reaction information to the presenter in real time by automatically generating such reaction information based on the participants actions.

The presentation coaching unit 235 is configured to provide a non-biased and safe environment for presenters to practice and improve their public speaking skills. The presentation coaching unit 235 may also be useful for presenters who do not have anyone available with whom they can practice their presentation. The presentation coaching unit 235 may utilize a delivery attributes model 1170 to analyze audio, video, and presentation content with machine learning models trained to identify aspects of the presenter's presentation skills and the presentation content are good and those that may benefit from improvement. The presentation coaching unit 235 may provide feedback critiques on aspects of the presentation skills, such as but not limited to pacing, vocal pattern, volume, whether the presenter is speaking in monotone, and/or language usage. The language usage aspect may include identifying use of filler words, informal speech, slang, euphemisms, culturally sensitive terms, obscene or vulgar language, usage of vocabulary that is unusual or may be confusing or unnecessarily complicated. The presentation coaching unit 235 may also detect when the presenter is being overly wordy. The presentation coaching unit 235 may also detect where the presenter is simply reading text on a slide or other presentation content.

The presentation designer unit 230 is configured to automatically generate design ideas for presentation slides. The presentation designer unit 230 may be implemented by Microsoft PowerPoint Designer. The presentation designer unit 230 may utilize a slide attributes model 1180 that is configured to automatically generate design ideas for a presentation. The presentation designer unit 230 is configured to analyze content that a user is adding to a slide and to provide professionally designed layout suggestions based on the content added by the user. The layout suggestions may include suggested photographs that complementent the content added by the user and a design scheme with colors that complement the photos chosen by the user. The presentation designer unit 230 may detect the additional of content items, such as pictures, charts, or tables, to a slide and provide suggestions for arranging these items in a cohesive fashion.

While the example implementation shown in FIG. 2 discusses the use of the techniques disclosed herein with an online presentation, the techniques for automatically generating reaction information for a presenter may be extended to online communications sessions or online meetings where one participant may at least temporarily assume the role of a presenter by speaking to the other participants of the online communications session about some topic. The presentation and communications platform 110 may analyze the audio and/or video streams captured by the client devices 105 of the other participants and automatically generate reactions as discussed above. The reactions may be presented to just the participant that is currently acting as a presenter or to all the participants of the online communications session.

The content creation and editor unit 205 may provide an application that allows a presenter to create and/or edit content to be presented during an online presentation and/or during an online communications session. The presenter may create the presentation context on their client device 105 or another computing device and import the presentation content to the presentation and communications platform 110 to host the online presentation. The content creation and editor unit 205 may provide the presenter with another option for creating and/or editing the presentation content via a web-based application. The content creation and editor unit 205 may provide a user interface that may be accessed via the browser application 255*a* of the client device 105*a* of the presenter that allows the presenter to create and/or edit the content of the presentation online. The presentation and communications platform 110 may also be configured to store the presentation content for the presenter and/or to enable the presenter to store the presentation in a cloud-based file hosting service, such as but not limited to Microsoft OneDrive or Google Drive.

The stream processing unit 215 may be configured to process the media streams received from the client devices 105 and to analyze the contents of the media streams to automatically identify participant reaction information and/or to generate feedback that may be used to help the presenter improve their presentation skills. The stream processing unit 215 may use or more machine learning models to analyze the media stream content and to provide high-level feature information that may be used by one or more downstream components to provide various features to the presenter and/or the participants of the online presentation. Additional features of the stream processing unit 215 are provided in the examples that follow.

The feedback and reporting unit 225 may be configured to receive high-level feature information generated by the stream processing unit 215 and reactions information provided by the participants and to generate one or more summary reports provide participant reaction information and recommendations for how the presenter may improve their presentation skills and/or presentation content. The reporting aspect of the feedback and reporting unit 225 may be triggered automatically at the end of an online presentation to provide the summary reports to the presenter. The feedback aspect of the feedback and reporting unit 225 may include providing to the presenter live feedback received from participants during the presentation. The examples which follow provide additional details of how such live feedback may be generated based on the machine learning models identifying reactions based on express and/or implicit reactions information provided by the participants. The feedback may be presented to the presenter and/or shared with the participants of the online presentation session. The feedback may also be summarized in the reactions information in the summary reports provided to the presenter upon completion of the online presentation session.

Figure 16:
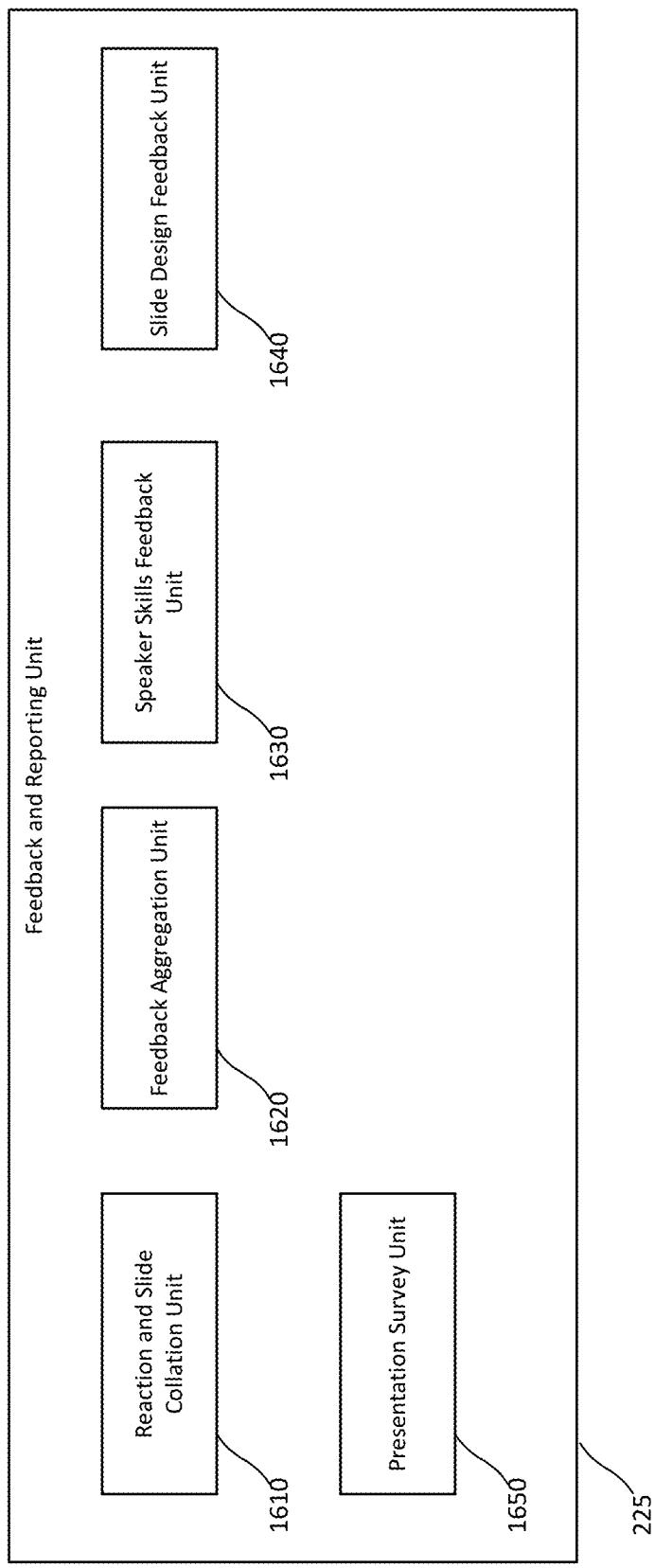
FIG. 16 is a block diagram that shows additional features that may be included in the feedback and reporting unit.

FIG. 16 is a block diagram that shows additional features that may be included in the feedback and reporting unit 225. The feedback and reporting unit 1610 may include a reaction and slide collation unit 1610, a feedback aggregation unit 1620, a speaker skills feedback unit 1630, a slide design feedback unit 1640, and a presentation survey unit 1650. The feedback and reporting unit 225 may include other elements in addition to or instead of one or more of the elements shown in FIG. 6.

The presentation survey unit 1650 may be configured to present a survey to participants of the online presentation at the end of the online presentation and/or when the participant exits from the online presentation. The presentation survey unit 1650 may be configured to display the survey to the participant on the user interface of the native application 255 or the browser application 260. In other implementations, the survey may be generated by presentation survey unit 1650 and the survey content and/or a link to the survey content may be sent to the participant at the end of the online presentation and/or when the participant exists the online presentation. The presentation survey unit 1650 may receive from the client device 105 survey response data as part of the reactions data 315. In other implementations, the survey may be hosted by the presentation and communications platform 110, and the survey may be accessed by a link included in an email or presented to the user in a message on the user interface of the native application 255 and/or the browser application 260. The survey responses may then be received by the presentation survey unit 1650. The survey responses from the participants may be used to generate feedback for the presenter that may be included in the summary reports provided to the presenter. The survey response data may be received after the summary reports are generated, and the summary reports may be updated as survey response data is received.

The survey may allow the participant to rate various aspects of the online presentation, including aspects of the presenter's presentation skills and various aspects of the slide design of the presentation slides. The survey response data may be provided to the model updating unit 220 to be analyzed with the reactions data provided by the participants. The survey response data may be used by the model updating unit 220 to update the slide attribute model 1180 and/or the delivery attributes model 1170.

The reaction and slide collation unit 1610 may be configured to associate the participant reactions with a particular slide in the online presentation content. The reactions data 315 received from the client devices 105 of the participants may include a timestamp. Furthermore, the reactions information generated by the analyzer unit 415 by analyzing the audio content, video content, and/or multi-modal content captured by the client devices 105 of the participants may also include a timestamp indicating when each reaction occurred. The presentation hosting unit 240 may also maintain timestamps for each of the presentation slides indicating when the slide was first displayed during the presentation and for how long the slide was displayed. The reaction and slide collation unit 1610 may collate the reactions information with each slide based on the timestamp indicating when the slide was displayed, and the timestamps associated with each of the participant reactions included in the reactions information. The reaction and slide collation unit 1610 may include the reactions information associated with each slide in the summary reports that may be provided to the presenter once the online presentation has been completed. The reaction and slide collation unit 1610 may also provide this information to the model updating unit 220 for analysis to potentially update the delivery attributes model 1170 or the slide attributes model 1180.

The feedback aggregation unit 1620 may be configured to receive the high-level feature information output by the analyzer unit 415 and aggregate the high-level feedback into categories that may be reported to the presenter in the summary reports. The high-level feedback information may include gestures, gaze direction, emotional state, body pose, and/or other information that may indicate how the participants reacted to the online presentation. The high-level feature information may indicate that the participants were interested, bored, confused, distracted, or had another reaction to the online presentation. This information may provide useful feedback to the inventor for improving the presentation contents. The feedback aggregation unit 1620 may be configured to provide the user with the following categories of feedback: (1) slide design, (2) speaker skills, (3) interesting content, and (4) engagement with the audience. There may be some overlap between the reaction information associated with each of these categories. The feedback aggregation unit 1620 may maintain a mapping between each category and the types of reaction information that may be used to determine which category with which a particular reaction should be associated. For example, the slide design category may be associated with a thumbs up, thumbs down, happy face emoji, confused face emoji, lack of eye contact with the screen or downward gaze by a participant, and/or other reaction information that may be expressly provided by the participant by clicking on a reaction icon on their respective client device 105 and/or by making specific gesture or other action that is captured by the client device 105 of the participant. Other categories may be associated with other reactions. The presentation and communications platform 110 may provide a user interface that allows presenters or an administrator to define categories to be included in the summary report and the types of reactions that are associated with each category.

The speaker skills feedback unit 1630 may be configured to provide feedback on the presenter's speaking skills during the presentation. The speaker skills feedback unit 1630 may be configured to receive high-level feature information from the analyzer unit 415 related to the audio and/or video content of the presenter captured by the client device 105. The speaker skills feedback unit 1630 may be configured to identify aspects of the presentation that the presenter did well and aspects of the presentation that the presenter may improve. The speaker skills feedback unit 1630 may identify issues with the presenter's presentation style, such as the language usage, language patterns, monotone delivery, reading of slide content, emotional state of the presenter, eye contact and/or gaze direction of the presenter, body pose of the presenter, and/or other information about the presenter and/or the participants. The speaker skills feedback unit 1630 may identify aspects of the presenter's presentation style that were done well during the online presentation. The suggestions for improving the presentation skills and/or the commendations for presentation skills that the presenter performed well may be included in the summary report or reports provided to the presenter at the end of the online presentation.

The slide design feedback unit 1640 may be configured to provide feedback on the design of the slides presented during the presentation. The slide content presented during the online presentation may be analyzed by the slide attributes model 1180 may be configured to provide feedback and suggestions for improving the layout of the presentation slides. The presenter may also analyze their presentation slides in advance of the online presentation to obtain feedback for improving the presentation slides prior to presenting before an audience.

The slide design feedback unit 1640 may obtain navigation signals included in the reactions data 315 that indicates when a participant has navigated to a different slide than was being discussed by the presented and/or zoomed in or out on the content of a particular slide. Such navigation signals may indicate that the participant is confused about the contents of a particular slide or is bored by the content of the slide being presented. The slide design feedback unit 1640 may provide slide design suggestions that may be included in the summary report or summary reports provided to the presenter after the online presentation is completed.

Returning to FIG. 2, the model updating unit 220 may be configured to update the slide attribute model 1180 and/or the delivery attributes model 1170 based on the participant reaction information determined by the stream processing unit 215. The slide attribute model 1180 and/or the delivery attributes model 1170 may analyze the online presentation, and the presentation designer unit 230 and the presentation coaching unit 235 may use the inferences output by the slide attribute model 1180 and/or the delivery attributes model 1170 to provide feedback to the presenter for improving the online presentation content and/or the presentation skills of the presenter. The model updating unit 220 may utilize the reaction data obtained from the participants of the online presentation to improve the recommendations provided by the slide attribute model 1180 and/or the delivery attributes model 1170.

The presentation designer unit 230 and/or the presentation coaching unit 235 may be utilized by the presenter before an online presentation to provide feedback to the presenter regarding slide design and/or presentation style of the presenter. The presenter can rehearse the presentation and obtained feedback before presenting to a live audience. The presentation designer unit 230 and the presentation coaching unit 235 and/or the presentation coaching unit 235 may also be utilized to provide feedback regarding the slide design and/or presentation style of the presenter during an online presentation. The recommendations provided by the presentation designer unit 230 and/or the presentation coaching unit 235 may be analyzed and compared with the reactions information received from the participants of the online presentation to determine whether the slide attribute model 1180 and/or the delivery attributes model 1170 may need to be updated.

Audience engagement may be used assess whether the recommendations provided by the slide attribute model 1180 and/or the delivery attributes model 1170 may need to be updated. As discussed in the preceding examples, explicit and/or implicit reactions information received from the participants may be collected and aggregated. The reactions may be aggreged on a per slide basis to assess audience engagement for a particular slide. The model updating unit 220 may be configured to determine a discrepancy between the inferences regarding slide and/or presentation skills provided by the slide attribute model 1180 and/or the delivery attributes model 1170 and the reactions of the participants associated with that particular slide.

The feedback and reporting unit 225 may provide the model updating unit 220 with the aggregated recommendation information for the presenter and/or aggregated reactions information from the participants where the reactions information and/or reactions information have been aggregated on a per slide basis. The reactions information may include positive or negative feedback for the presentation contents and/or the presentation skills of the inventor. Audience engagement may vary throughout a presentation. Aggregating these reactions on a per-slide basis allows the model updating unit 220 to identify specific parts of the presentation where the presenter did well and other parts of the presentation where certain aspects of the presentation may be improved. The model updating unit 220 may identify discrepancies between the recommendations provided by the slide attribute model 1180 and/or the delivery attributes model 1170 and the reactions of the participants.

Figure 11:
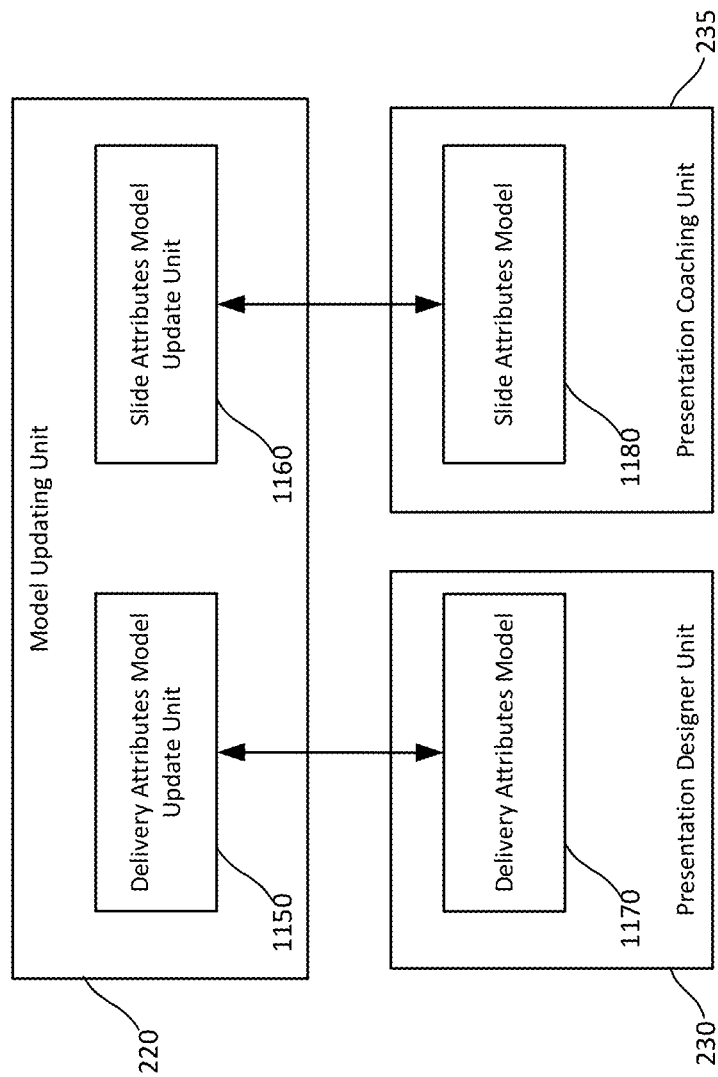
FIG. 11 is a block diagram that shows additional features that may be included in the model updating unit.

FIG. 11 shows that the model updating unit 220 may include a delivery attributes model update unit 1150 and a slide attributes model update unit 1160. The delivery attributes model update unit 1150 may automatically analyze the feedback results provided by the delivery attributes model 1170 and the reactions information provided by the participants to identify a set of discrepancies between the feedback provided by the model and the reactions provided by the participants. Furthermore, the slide attributes model update unit 1160 may automatically analyze the feedback results provided by the slide attributes model 1180 and the reactions information provided by the participants to identify a set of discrepancies between the feedback provided by the model and the reactions provided by the participants. The model updating unit 220 may be configured to adjust one or more operating parameters of the slide attribute model 1180 and/or the delivery attributes model 1170 to improve the feedback provided by the slide attribute model 1180 and/or the delivery attributes model 1170. Improving the feedback provided by these models enables the presenter to design better slide layouts and to further refine their presentation skills, which may improve audience engagement.

The slide attributes model 1180 and/or the delivery attributes model 1170 may be implemented as explainable models, such as but not limited to Gradient Boosted Trees. Using explainable models to implement the slide attributes model 1180 and/or the delivery attributes model 1170 provides transparency as to why the model made a particular inference regarding the design of the slides of the presentation or regarding a particular speaking skill of the presenter. The slide attributes model 1180 may be trained to infer the relationship between slide attributes and with audience feedback. The audience feedback may be explicit, such as the participant clicking a reactions emoji or making a particular gesture associated with a particular reaction, or implicit where the participant's reaction may be inferred from the participant's behavior. For example, the participant may have a slumped body posture and/or be looking away from the display of the client device 105 indicating that the participant may be bored or confused. The model updating unit 220 may determine audience engagement at points in time throughout the presentation, such as for each slide of the presentation, based on the explicit and/or implicit feedback received from the participants.

The presentation hosting unit 240 may permit the presenter to schedule the online presentation or communication session in which the online presentation is to be presented. The scheduling and participant invitation unit 210 may provide a user interface that allows the presenter to schedule the online presentation or communication session in which the online presentation is to be presented. The scheduling and participant invitation unit 210 may send invitations to participants to participate in an online presentation. The invitations may include a link to the online presentation and/or a Quick Response (QR) code that the participant may scan in order to connect to the online presentation or to accept the invitation to participate in the online presentation. The scheduling and participant invitation unit 210 may add a reminder to the calendar of the participants for the date and time for which the online presentation is scheduled.

In the example shown in FIG. 2, the client device 105a is being used by the presenter to control an online presentation or to facilitate an online communications session, and the client device 105b is being used by a participant of the online presentation to receive and consume the online presentation content. The client device 105a may include a native application 250a, a browser application 255a, a stream processing unit 260a, and a content capture unit 265a, and the client device 105b may include a native application 250b, a browser application 255b, a stream processing unit 260b, and a content capture unit 265b. Client devices 105c and 105d have been omitted from FIG. 2 as a matter of clarity. Each of the client devices may include the same elements or may include a different combination of elements. The client devices 105 of the presenter and the participants need not be identical.

The native applications 250a and 250b may be an application developed for use on the client device 105. The native applications 250a and 250b may be a presentation application that may communicate with the presentation and communications platform 110 to provide a user interface for creating, modifying, participating in, and/or conducting online presentations. The native applications 250a and 250b may also be a communications platform application, such as but not limited to Microsoft Teams, which may permit a presenter to share an online presentation with participants as part of an online communications session. The native application 250a and 250b may be the same application or a different application in some implementations. For example, the presenter may present an online presentation using a first native application 250a while a participant may view and/or participate in the online presentation using a second native application 250b.

The browser applications 255a and 255b may be an application for accessing and viewing web-based content. The browser applications 255a and 255b may be the same application or may be different applications. In some implementation, the presentation and communications platform 110 may provide a web application for conducting and/or participating in an online presentation and/or communication session. The presenter or the participants may access the web application and render a user interface for interacting with the presentation and communications platform 110 in the browser applications 255a and 255b. In some implementations, the presentation and communications platform 110 may support both the native application 250a and 255b and the web application, and the presenter and participants may choose which approach best suites them for conducting and/or participating in an online presentation and/or communications session.

The client device 105a may also include a stream processing unit 260a, and the client device 105b may include a stream processing unit 260b, which may be configured to generate one or more media streams to be transmitted to the presentation and communications platform 110. Some examples of the media streams that may be transmitted between the presentation and communications platform 110 and the client devices 105 are described in greater detail with respect to FIG. 5.

The content capture units 265a and 265b may be configured to capture audio content and/or video content using the microphone and camera of the client device 105a and 105b, respectively. The content capture units 265a and 265b may be configured to interface with these hardware elements to capture the audio content and video content that may be provided to the stream processing units 260a and 260b of the respective client devices 105a and 105b. The stream processing units 260a and 260b may be configured to process the audio content and/or the video content obtained by the content capture units 265a and 265b, respectively, and process that audio content and/or video content into one or more media streams that may be transmitted to the presentation and communications platform 110.

Figure 3:
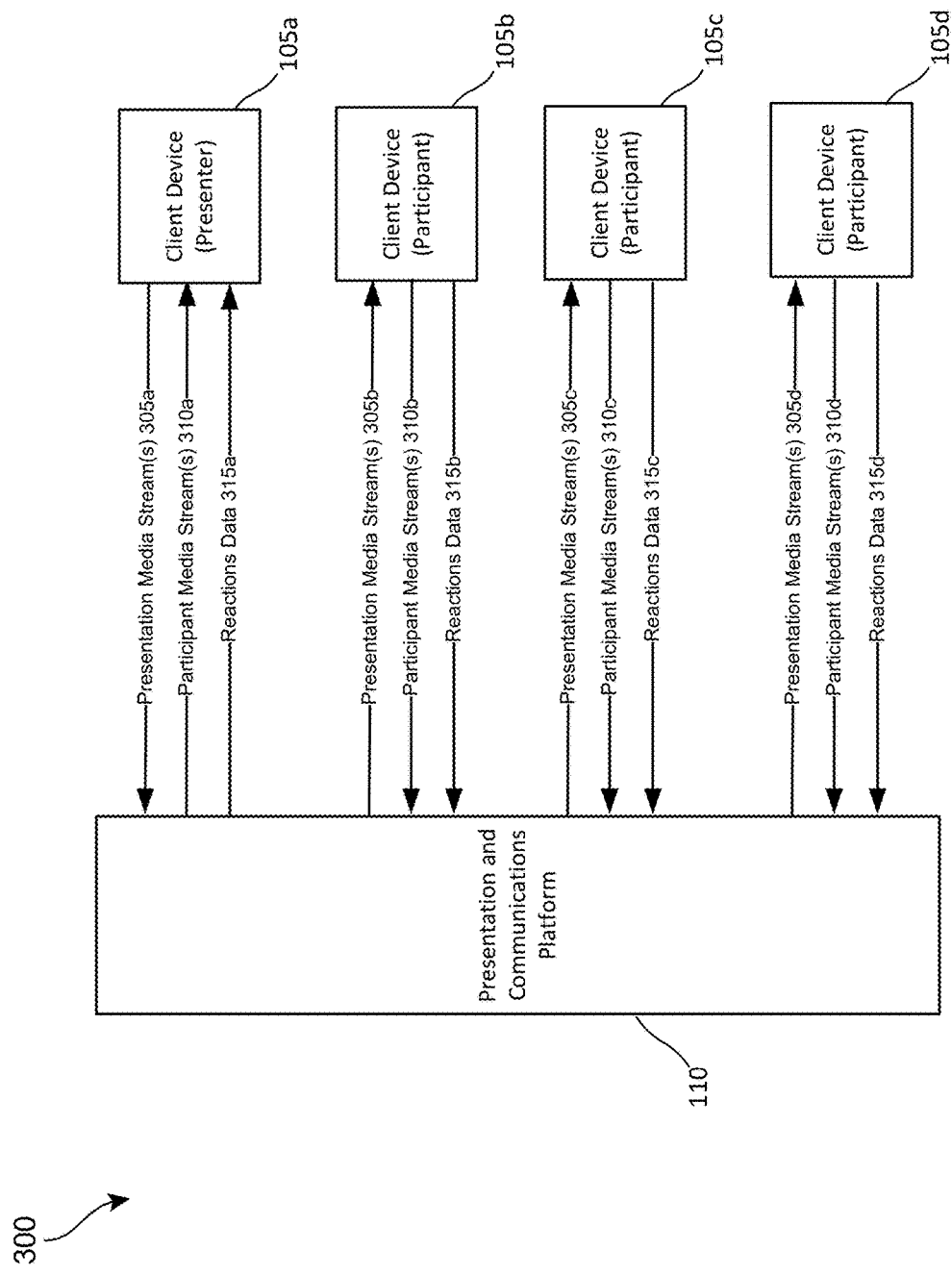
FIG. 3 is a diagram showing examples of data streams exchanged between the presentation and communications platform and the client devices.

FIG. 3 is a diagram showing examples of data exchanged between the presentation and communications platform 110 and the client devices 105a, 105b, 105c, and 105d. As discussed in the preceding examples, the presentation and communications platform 110 may transmit one or more presentation media streams 305 to the each of the client devices 105 over the network 120. The one or more presentation media streams 305 may include one or more audio media streams, one or more video media streams, and/or other media streams. The one or more presentation media streams may include an audio component of the presentation where the presenter is discussing presentation content being shared with the participants. The presentation content may include a set of slides, a document, or other content that may be discussed during presentation. The presentation content may be provided to the client devices of the participants by the presentation and communications platform 110 before or during the online presentation. A copy of the presentation content may be provided to the computing devices 105 of the participants to permit the participants to navigate independently through the presentation content during the online presentation. The presentation media streams 305 may include navigation signals that may be used by the computing devices 105 of the participants to display a particular portion of the presentation content that the presenter is currently discussing in the online presentation. A participant may override these navigation signals and independently navigate to a different slide or portion of the presentation content during the presentation and/or zoom in or zoom out on a slide or portion of the presentation. Such navigation overrides may be reported to the presenter as navigation signals included in the reactions data 315 to permit the presenter to identify portions of the presentation that may be unclear or for which the presenter should have spent more time discussing. The reactions data 315 received from the participants may be anonymized by the presentation and communications platform 110 to remove any personalized information that may identify that a particular reaction has originated from a particular participant. The anonymized data may be presented to the presenter during the online presentation and/or included in one or more summary reports generated for the presenter at the conclusion of the online presentation.

The client devices 105b, 105c, and 105d of the participants of the presentation may send one or more participant media streams 310b, 310c, and 310d to the presentation and communications platform 110. The presentation and communications platform 110 may analyze the participant media streams 310b, 310c, and 310d, as will be discussed in the examples that follow, to identify reactions by the participants. The presentation and communications platform 110 may also aggregate the participant media streams 310b, 310c, and 310d into the participant media stream 310a which is sent to the client device 105a of the presenter. The client device 105a of the presenter may present the participant media stream 310a to the presenter so that the presenter. The participant media stream 310a may include audio and/or video content of the participants of the online presentation. The presenter may wish to be presented with this content so the presenter may hear questions and/or see the participants of the online presentation to better engage with the audience. The client devices 105b, 105c, and 105d may also transmit reactions data 315 to the presentation and communications platform 110. The reactions data 315 may be generated by the client device 105 of the participants in response to the participant selecting a reaction icon or emoji representing the participants' reactions to the presentation.

Figure 4:
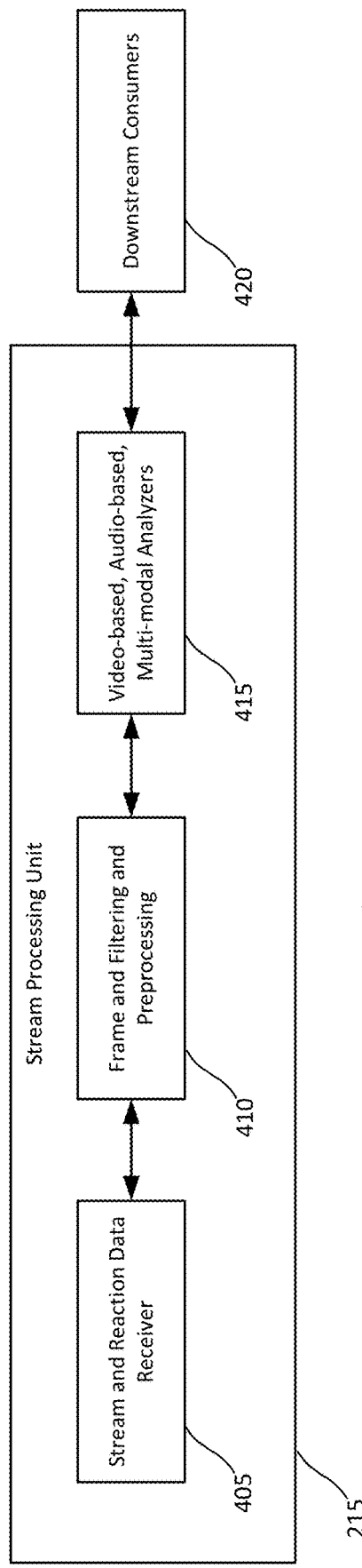
FIG. 4 is a diagram showing additional details of the stream processing unit shown in FIG. 2.

FIG. 4 is a diagram showing additional details of the stream processing unit shown as 215 in FIG. 2. The steam processing unit may include a stream and reaction data receiver unit 405, a frame and filtering preprocessing unit 410, and a video-based, audio-based, and multi-modal analyzer unit 415 (also referred to herein as "analyzer unit 415").

The stream and reaction data receiver unit 405 may be configured to receive the presentation media streams 305a from the client device 105a of the presenter, and the participant media streams 310b, 310c, and 310d and the reactions data 315b, 315c, and 315d from the client devices 105b, 105c, and 105d of the participants to the online presentation. The stream and reaction data receiver unit 405 may output the received streams as an input to the frame and filtering preprocessing unit 410.

The frame and filtering preprocessing unit 410 may be configured to convert the media streams and/or reaction data received by the stream and reaction data receiver unit 405 into a format or formats that the machine learning models of the analyzer unit 415 may utilize. The frame and filter preprocessing unit 410 may be configured to perform feature extraction on the media streams and/or reaction data. The particular features that may be extracted depend on the types of machine learning models are implemented by the analyzer unit 415. In some implementations, the models may be grouped into categories of models where each of the categories of model may share the same preprocessing feature extraction steps. This approach provides a technical benefit of reducing the processing resources required to preprocess the media streams and/or reaction data by performing the feature extraction for a particular category of model once and providing those features as an input to each of the models of that category.

The output from the stream processing unit 215 may be provided to one or more downstream consumers 420. The downstream consumers 420 may include the feedback and reporting unit 225 and the presentation coaching unit 235 of the presentation and communications platform 110. Other downstream consumer 420 may also be configured to receive the outputs of the stream processing unit 215. The output from the stream processing unit 215 may include high-level feature information. The high-level feature information may include information such as gestures being made by the presenter and/or the participants, language usage by the presenter, a language pattern of the presenter, emotional state of the presenter and/or the participants, eye contact and/or gaze direction of the presenter, body pose of the presenter and/or participants, and/or other information about the presenter and/or the participants. The high-level feature information may be generated by the machine learning models of the analyzer unit 415. These models will be described in greater detail with respect to FIG. 6.

Figure 5:
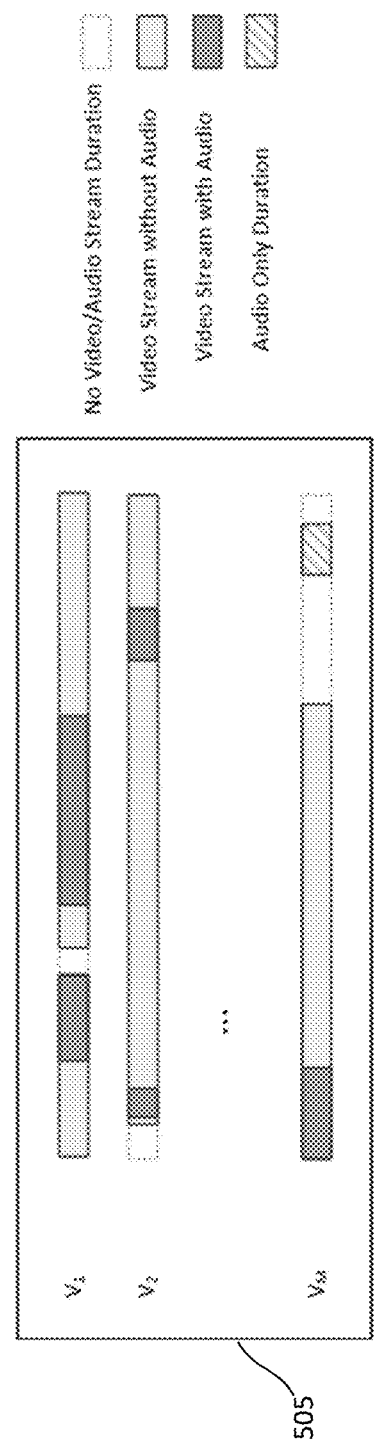
FIG. 5 is a diagram showing an example of video streams received at the presentation and communications platform and the client devices.

FIG. 5 is a diagram showing an example of video streams 505 that may be received at the presentation and communications platform and the client devices. FIG. 5 shows that the video streams may be intermittent, may be received without audio, may be received with audio, or may be received as audio-only. The intermittent nature of the video streams may be a result of network issues and/or the streams being interrupted at the client device 105. For example, a participant at a client device 105 may turn on or off the video camera and/or the microphone of the client device 105. Some participants may enable the microphone and disable the video camera of their client devices 105, while other participants may enable the video camera and disable the microphone. As a result, the client devices 105 of the participants may generate audio media stream, video media streams, no media streams, or intermittently generate different types of media streams as the participants change the settings of the respective computing devices 105 during the online presentation.

The frame and filtering preprocessing unit 410 may be configured to handle the changing conditions of the stream content. The frame and filtering preprocessing unit 410 may be configured to determine whether a particular media stream contains audio, video, or both at a particular time and to process the stream using to convert the media stream into an appropriate format to serve as an input to the machine learning models for analyzing that type of content. As the type of content changes over time, the frame and filtering preprocessing unit 410 may adapt to the change in content type. For example, the stream vi shown in FIG. 5 initially includes a vide stream without audio but later includes an audio component. Initially, the frame and filtering preprocessing unit 410 may process the stream vi to generate an input or inputs for models that process features from video content. Later, the frame and filtering preprocessing unit 410 may process the stream vi to generate an input or inputs for models that may process features from video content, audio content, or multimodal content. The examples shown in FIG. 5 illustrate the concepts disclosed herein and do not limit the media streams to the specific configuration shown therein. In other implementations, separate audio streams and video streams may be generated by the client devices 105 during the online presentation, and the frame and filtering preprocessing unit 410 may process each of the media streams separately.

Figure 6:
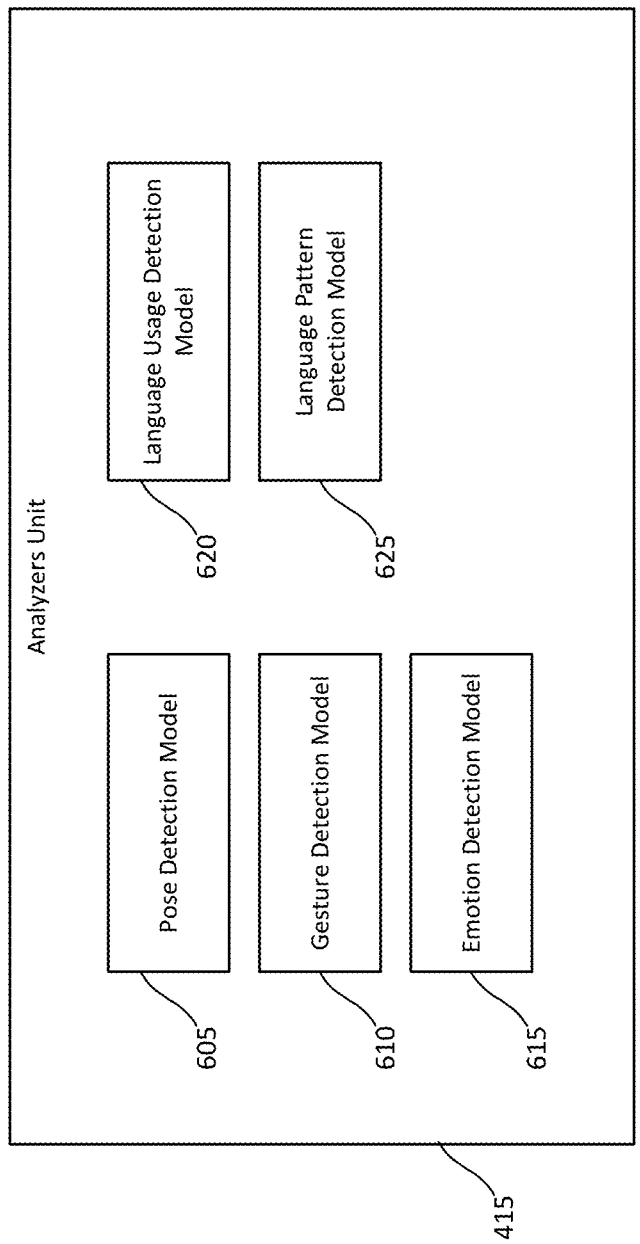
FIG. 6 is a diagram showing additional details of the video-based, audio-based, and multi-modal analyzer unit shown in FIG. 4.

FIG. 6 is a diagram showing additional details of the video-based, audio-based, and multi-modal analyzer unit 415 shown in FIG. 4. The client devices 105 of the participants and the presenter may include a microphone for capturing audio content of the presenter and a camera for capturing video content of the presenter. The analyzer unit 415 may include one or more machine learning models trained to analyze audio-based content, video-based content, or multimodal content. Multimodal content may comprise audiovisual content which has both audio and video components.

The models may be local to the presentation and communications platform 110, such as those of the analyzer unit 415. At least a portion of the models may be implemented by a remote server or cloud-based services. In such implementations, the analyzer unit 415 may be configured to send the feature information expected by the model as an input to the remote server or services and to receive high-level feature information output by the remote model from the server or service. In some implementations the analyzer unit 415 may utilize the Microsoft Azure Application Programming Interface (API) for creating an interface between the analyzer unit 415 and one or more remote models. The models may be implemented using various machine learning architectures such as deep neural networks (DNNs), recurrent neural networks (RNNs), convolutional neural networks (CNNs), and/or other types of neural networks. The particular architecture selected for a model may be based on the type of analysis to be performed by the model. In some implementations, the models may be custom developed for a analyzing a particular aspect of a presentation. For example, a model may be trained to detect specific gestures that participants of an online presentation and/or communication session are expected to perform. Other models may be a more general-purpose model that is used to analyze a particular input and is not specifically tailored for use for analyzing content associated with online presentations. For example, a model for identifying language usage issues, such as obscenity or vulgar language may be a general-purpose model for identifying such language in audio or video content.

The models may be configured to receive feature data extracted from the presentation media streams 305, the participant media streams 310, and/or the reactions data 315. As discussed with respect to FIG. 4, the models may be grouped into categories of model based on what type of analysis the model is trained to perform and/or based on the inputs that the model is configured to received. The example shown in FIG. 6 includes a pose detection model 605, a gesture detection model 610, an emotion detection model 615, a language usage detection model 620, and a language pattern detection model 625. Other implementations of the analyzer unit 415 may include other models in addition to or instead of one or more of the models shown in FIG. 6. The models may be machine learning models trained to provide an output that includes high-level feature information based an output based on features included in the inputs. The types of high-level feature information that may be provided by a particular model depends upon the type of model being used and the types of participant or presenter behavior the model is configured to identify.

A technical benefit provided by the analyzer unit 415 is that machine learning models may analyze audio content, video content, and/or multi-modal content captured by the client devices 105 of both the presenters and the participants to automatically identify actions by the participants indicative of audience engagement and to automatically identify actions by the presenter that may impact audience engagement. The actions taken by the participants may be used to provide reactions information indicative of audience engagement to the presenter in real time during the presentation. The actions taken by the presenter may be used to identify presentation skills which the presenter may improve as well as presentation skills that the presenter has done well. The reactions information and presentations skills information may be compiled into a summary report, such as those shown in FIGS. 9 and 10, that may be provided to the presenter at the end of the presentation. These summary reports provide information that may be used by the presenter to understand how the audience perceived the presentation as a whole, suggestions for how the presenter may improve the presentation and/or their presentation skills, and a summary of aspects of the presentation that done well. The feature data associated with the presenter's actions may be provided to the presentation coaching unit 235 which may be configured to generate suggestions that the presenter may use to improve their presentation skills. The presentation coaching unit 235 may provide real-time tutorials to guide the presenter through a rehearsal of a presentation and provide critiques and feedback during the rehearsal that may help the presenter to improve their presentation skills. The presentation coaching unit 235 may also provide suggestions and feedback to the feedback and reporting unit 225 for inclusion of the suggestions and feedback in the summary reports that may be provided to the presenter after a presentation or rehearsal.

The pose detection model 605 may be configured to analyze features extracted from video content of the presenter or a participant to identify a pose of that person and to output high-level features information that represents the identified pose. The model may determine that the person is standing, sitting upright, slouched down, or some other position. The pose information may be indicative of engagement of a presenter or participant. For example, if the presenter is slouched down during the presentation, they may appear to be disinterested to the participants, and if the participant is slouched down, the participant may be bored or confused by the presentation content. The presentation coaching unit 235 may be configured to analyze the high-level features obtained from the pose detection model 605 to identify a pose of the presenter during a presentation or a rehearsal that may be distracting to the audience and may provide suggestions to the presenter for eliminating such poses.

The gesture detection model 610 may be configured to analyze features extracted from video content of the presenter or a participant to identify a gesture made by that person and to output high-level features information that represents the identified gesture. The gesture information may be output as high-level features and provided as an input to the feedback and reporting unit 225. The feedback and reporting unit 225 may be configured to identify certain gestures made by a participant as being a reaction that may be sent to the client device 105a of the presenter to help the presenter to gain an understanding of the audience engagement in near real time during the presentation. A technical benefit of this approach is that participants may make certain gestures to cause reactions to a presentation to be automatically generated without having to activate a button or icon for that reaction on the user interface. For example, the participant may clap, provide a thumbs up or thumbs down gesture, shrug, nod or shake their head, or perform actions that may be identified by the gesture detection model 610 and mapped to a reaction by the feedback and reporting unit 225. This approach may increase audience engagement with an online presentation.

The presentation coaching unit 235 may be configured to analyze the high-level features obtained from the gesture detection model 610 to identify a gesture made by the presenter during a presentation or a rehearsal that may be distracting to the audience and may provide suggestions to the presenter for eliminating such gestures. For example, the presenter may unconsciously touch their face or cover their mouth with their hand while presenting. Such behavior may be distracting to the audience, and the presentation coach may provide an indication to the presenter that the gesture should be avoided.

The emotion detection model 615 may be configured to analyze features extracted from video content of the presenter or a participant to identify an emotional state of that person and to output high-level features information that represents the identified emotional state. The emotion information may be output as high-level feature and provided as an input to the feedback and reporting unit 225. The feedback and reporting unit 225 may be configured to identify certain emotional states of a participant as being a reaction that may be sent to the client device 105*a* of the presenter to help the presenter to gain an understanding of the audience engagement in near real time during the presentation. Furthermore, the emotion information may be determined for the presenter, and this information may be used by the presentation coaching unit 235 to provide suggestions to the presenter if the presenter appears to be unhappy, anxious, angry, stressed, or exhibit other emotions that may distract from the presentation or otherwise impact the presenter's performance. The presentation coaching unit 235 may provide suggestions to the presenter for dealing with stress or anxiety related to public speaking. These suggestions may include techniques for dealing with stress or anxiety related to public speaking.

The language usage detection model 620 may be configured to analyze features extracted from video content of the presenter or a participant to identify language usage of that person and to output high-level features information that represents the language usage. With respect to the participants, the feedback and reporting unit 225 may be configured to identify certain language usage of a participant as being a reaction that may be sent to the client device 105*a* of the presenter to help the presenter to gain an understanding of the audience engagement in near real time during the presentation. For example, a participant may utter the word "what?" or utterance "huh?" during the presentation if they do not understand something that is being presented. The feedback and reporting unit 225 may be configured to maps this reaction to a "confused" reaction that may be sent to the client device 105*a* of the presenter to help the presenter to gain an understanding that at least some of the participants may be confused by a portion of the presentation. With respect to the presenter, the presentation coaching unit 235 may be configured to identify certain language usage of a presenter during a presentation or rehearsal that may detract from the presentation. For example, the feedback and reporting unit 225 may be configured to identify the usage of obscenities or vulgar language, slang, filler words, difficult words, and/or other language usage that the presenter should avoid. The presentation coaching unit 235 may provide suggestions for alternative language and/or language to be avoided during a presentation. These suggestions may be included in the summary report or reports that may be provided to the presenter at the end of the presentation.

The language pattern detection model 625 may be configured to analyze features extracted from video content of the presenter to output high-level features information that identifies the language pattern issues in the presentation. The language pattern detection model 625 may be trained to identify issues such as pacing, volume, pauses, and/or other issues related to the speech pattern of the presenter. For example, the language pattern detection model 625 may detect that the presenter may be speaking to quickly or too slowly, may be speaking too quietly or too loudly, or may be pausing too often or for too long during the presentation. The presentation coaching unit 235 may provide suggestions for improving the pacing, volume, and/or other aspects of the language patterns used by the presenter during the presentation. These suggestions may be included in the summary report or reports that may be provided to the presenter at the end of the presentation.

Figure 7:
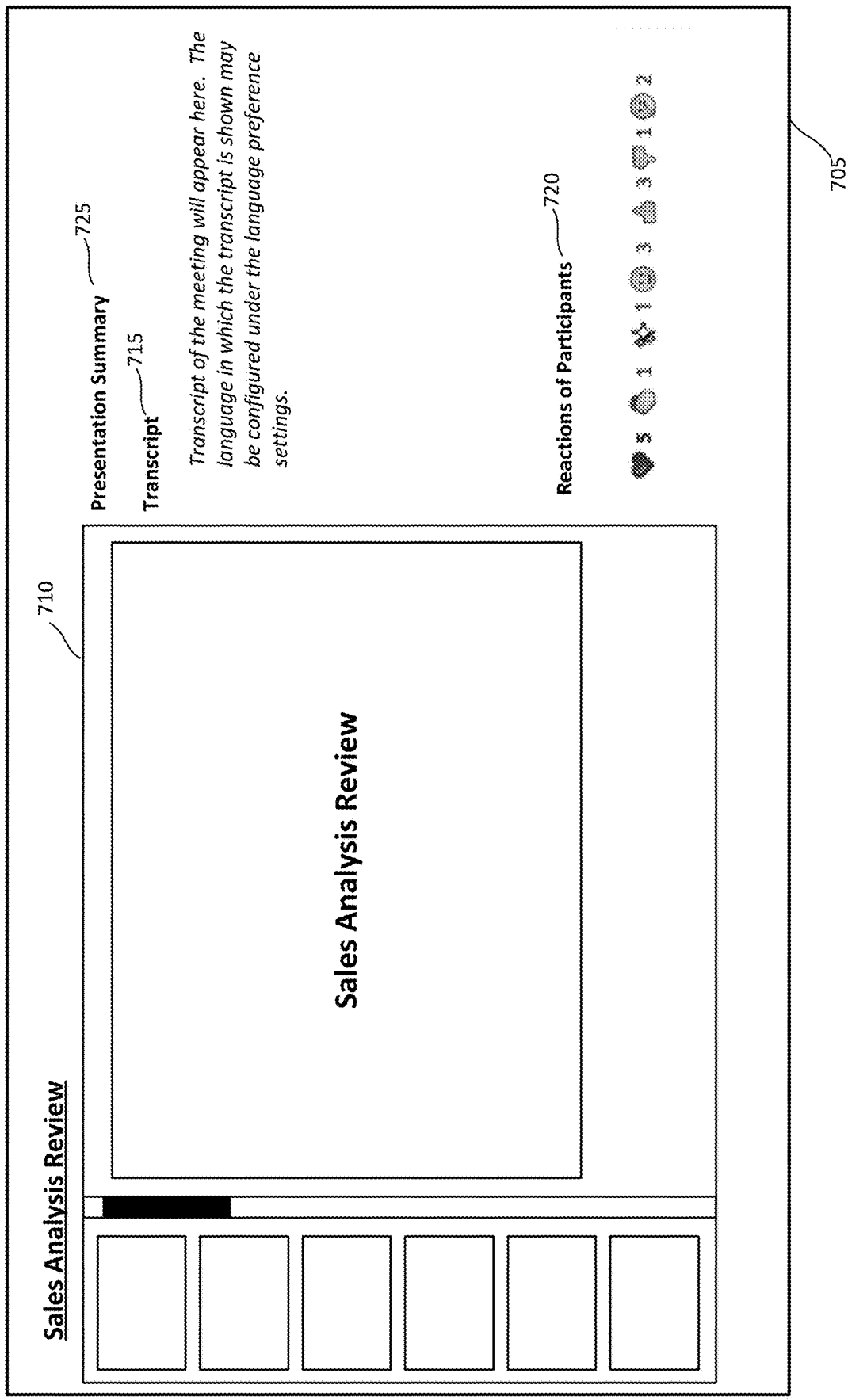
FIG. 7 is a diagram showing an example user interface for conducting an online presentation from the client device of a presenter.

FIG. 7 is a diagram showing an example user interface 705 for conducting an online presentation from the client device 105 of a presenter. The user interface 705 may be generated by the presentation hosting unit 240 and may be rendered in the browser application 255*a* or the native application 250*a* of the client device 105*a* of the presenter in such implementations. In other implementations, the native application 250*a* of the client device 105*a* of the presenter may be a presentation application that is configured to provide a user interface for creating, modifying, conducting, and participating in online presentations and/or communication sessions. The native application 250*a* may communicate with the presentation and communications platform 110 in such implementations to provide the various services described in the preceding examples.

The user interface 705 includes a content pane 710 that may be used to display a presentation or other content that the presenter is sharing with the participants to the online presentation or online communications session. The content pane 710 shown in FIG. 7 is displaying a slide show that is being presented to the participants. The content pane 710 may be used to display content received from the client devices 105 of the participants, such as video of the participants themselves or other content shared by the participants.

The user interface 705 may include a presentation summary 725 that may be used to present information about the online presentation and/or communication session to the presenter. A transcript 715 of the audio portion of the online presentation and/or communication session may be generated by the stream processing unit 215 by analyzing the spoken content provided by the presenter and the participants. The language in which the transcript is presented to the presenter and/or each of the participants may be configurable. In some implementations, the presenter may select the transcript language. In other implementations, the presentation and communications platform 110 may provide a user interface that enables the presenter and/or the participants to each set language preferences for the transcript. The presentation and communications platform 110 may be configured to automatically translate the transcript to the preferred language if supported or may be configured to obtain a translation of the transcript from an external translation service in substantially real time and to display the appropriate translation to the presenter and/or the participants. Thus, the presenter and/or participants may be able to participant in the online presentation and/or communication session in one language but may obtain a transcript in a second language with which the presenter and/or participants are more comfortable.

The reactions of participants 720 may also be displayed in the presentation summary 725. As discussed in the preceding examples, participants may provide user reactions to the online presentation and/or communication session from their respective client devices 105. The reactions data may be transmitted from the client devices 105 of the participants to the presentation and communications platform 110 in the reactions data 315. The reactions data 315 may include an indication that the participant has selected a reaction icon or emoji representing the participant's reactions to the presentation. The feedback and reporting unit 225 may receive the reactions data 315 from the client devices of the participants and combine that reach data 315 into the reactions data 315a transmitted from the presentation and communications platform 110 to the client device 105a of the presenter. As discussed in the preceding examples, the stream processing unit 215 may also be configured to recognize reactions included in the audio and/or video media streams of the participants captured by the participants' respective client device 105. The client devices 105 of the participants may transmit one or more participant media streams 310 that may be analyzed by the stream processing unit 215 to recognize gestures made by the participants. For example, a participant may make certain gestures that are captured in a video stream captured by client device 105 of the participant. These gestures may be recognized by the machine learning models used by the presentation and communications platform 110 to identify such gestures. The gestures may then be mapped by the feedback and reporting unit 225 to a reaction icon or emoji which provide a graphical representation of the reaction. The reaction icon or emoji be transmitted to the client device 105a of the presenter in the reactions data 315a.

The reactions of the participants 720 may display a representation of the reaction icon or emoji of each of the reactions received and a total indicating the number of reactions received. In some implementations, the reactions may also be displayed as an animation that may be overlaid on the contents of the content pane 710 as they are received. The presenter can use this reaction information as means for measuring audience engagement with the online presentation and/or communication session. The presenter may use this information to make changes to the online presentation and/or communication session.

The presentation and communications platform 110 may also provide an option that allows the present to selectively enable or disable the sharing of the reaction information with other users. The presentation and communications platform 110 may allow the presenter to enable or disable the sharing of the reaction information at any time during the presentation. In other implementations, the presentation and communications platform 110 may allow the presenter to selectively enable or disable reactions for specific presentations and/or online communications session or to enable or disable reactions by default for all presentations and/or online communications being hosted by the presenter. The presentation and communications platform 110 may allow the presenter to override these presentation-specific and/or defaults settings to selectively enable or disable the sharing of the reaction information with the participants. The client devices 105 of the participants may display these reactions as will be discussed with respect to the user interface shown in FIG. 8.

The layout of the user interface 705 is an example of one possible layout of the user interface that may be provided by the presentation and communications platform 110 and/or the native application 250. Other implementations may utilize a different layout and may omit one or more of the features shown in FIG. 7 and/or include one or more additional features not shown in example of FIG. 7. For example, the user interface 705 may include one or more control elements that are not shown that allows the presenter to configure one or more aspects of the online presentation and/or communication session. The user interface 705 may include controls for enabling and/or disabling sharing of reaction information with participants, for enabling and/or disabling the microphone and/or the video camera of the client device 105a of the presenter, for setting the transcript language and/or for enabling or disabling the display of the transcript on the user interface 705.

Figure 8:
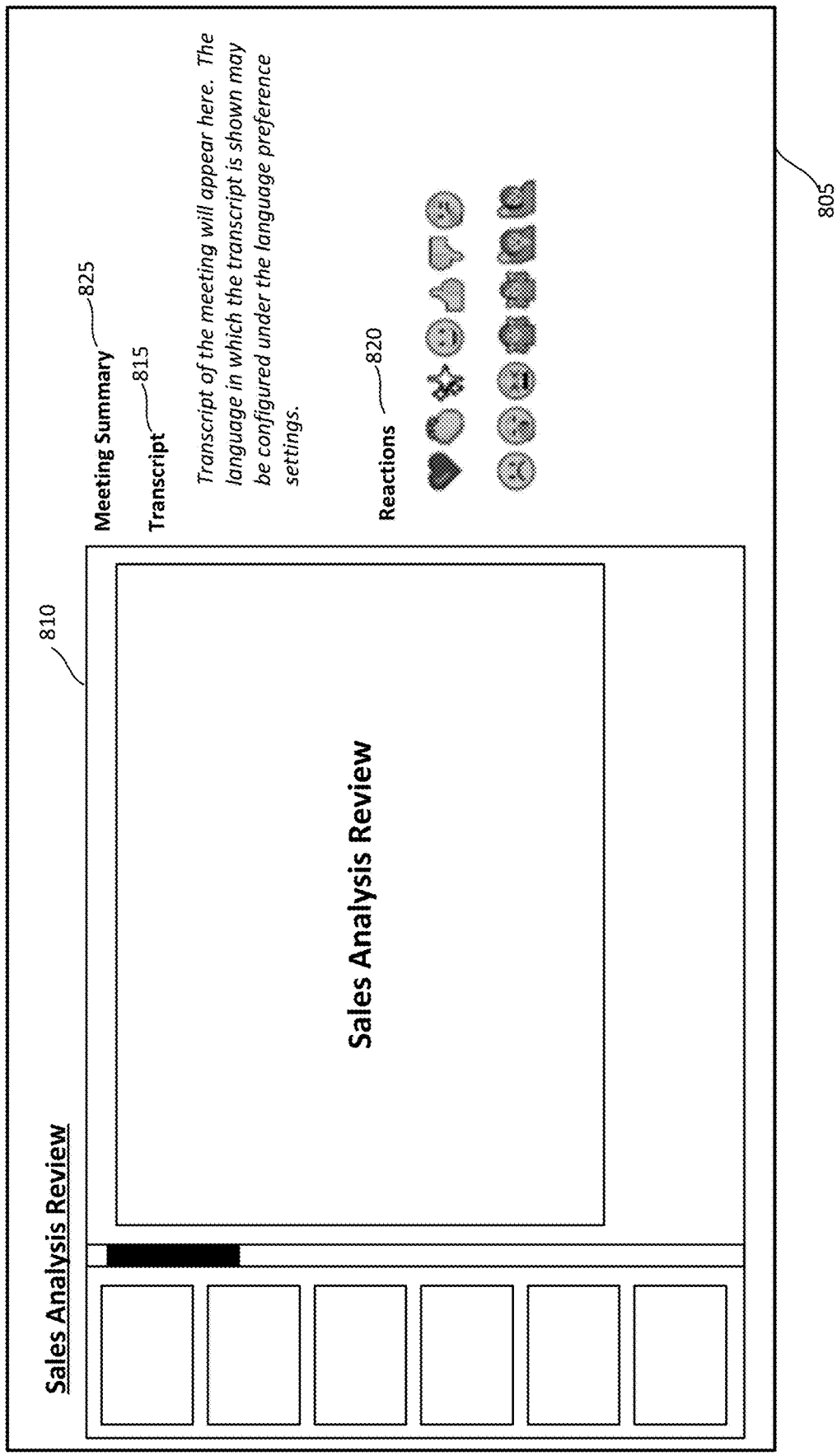
FIG. 8 is a diagram showing an example user interface for participating in an online presentation from the client device of a participant.

FIG. 8 is a diagram showing an example user interface 805 for participating in an online presentation from the client device 105 of a participant. The user interface 805 may have a layout that is similar to the user interface 705 shown on the client device 105 of the presenter. The user interface 805 may be generated by the presentation hosting unit 240 and may be rendered in the browser application 255 or the native application 250 of the client device 105 of the participant in such implementations. In other implementations, the native application 250 of the client device 105 of the participant may be a presentation application that is configured to provide a user interface for creating, modifying, conducting, and participating in online presentations and/or communication sessions. The native application 250 may communicate with the presentation and communications platform 110 in such implementations to provide the various services described in the preceding examples.

The user interface 805 may include a content pane 810 that is similar to the content pane 710 of the user interface 705. The content pane 810 may be used to display presentation content being presented by the presenter and/or video content of the presenter and/or other participants. The presentation and communications platform 110 may associate presentation content uploaded by the presenter with the presentation and/or online session. The presentation and communications platform 110 may send a copy of the presentation content to the client device 105 of the participants as the participants join the online presentation and/or communication session. The presentation content may be a set of slides created by a presentation application, such as a Microsoft PowerPoint, Google Slides, or Prezi. The presentation content may comprise a document, such as a Microsoft word document, a Google Docs document, or other type of word processing document. The presentation content may also include other types of content, such as video content, web-based content, images, video, and/or other types of content.

The client device 105a of the presenter may transmit navigation signals in the presentation media streams 305a which indicate a position within the presentation content which the presenter is currently discussing. The navigation signals may be detected in the presentation media streams 305 received by the client devices 105 of the participants and used to synchronize the display of the presentation content in the content pane 810 of the user interface 805 with the location being discussed by the presenter. The user interface 805 may be configured to allow the user to override the automatic navigation to independently navigate to a different portion of the presentation content than the presenter is currently discussing. For example, a participant may navigate back to a previous slide in a presentation to refer to content included therein. The user may navigate using a keyboard, mouse, touchscreen, or other navigational tools available on the client device 105. The user interface 805 may be configured to detect such an override of the automatic navigation and to report details of such manual navigation in the reaction data 315. For example, the manual navigation information may include information as to which portions of the presentation content to which the participant navigated, at which point in the presentation the user navigated to these portions, and how long the user remained on these portions of the presentation. The manual navigation information may be collected and reported back to the presentation and communications platform 110. The presentation and communications platform 110 may analyze this information to determine whether the certain portions of the presentation may not have been clear and may benefit from additional details.

The user interface 805 may include a presentation summary 825 that is similar to the presentation summary 725 shown in the user interface 705 used by the presenter. The transcript 815 may be similar to the transcript 715 of the user interface 705. The presentation summary 825 shown to the participants may be slightly different from that shown on the user interface 705. For example, the user interface 805 may include reactions 820. The reactions 820 includes a set of reaction icons or emojis providing a graphical representation of various reactions to the presentation content. The user may click on or otherwise activate a reaction icon or emoji to cause the user interface 805 to send an identifier for the reaction icon or emoji to the presenter. The identifier for the reaction icon or emoji may be added to the reactions data 315 sent by client device 105 of the participant to the presentation and communications platform 110. As discussed in the preceding examples, the presentation and communications platform 110 may add the aggregate the reactions data 315 from each of the participants and send the aggregated data to the client device 105a of the presenter for display. In some implementations, the aggregated reactions data may be provided to the client device of each of the participants and may be displayed to the participants.

Figure 9:
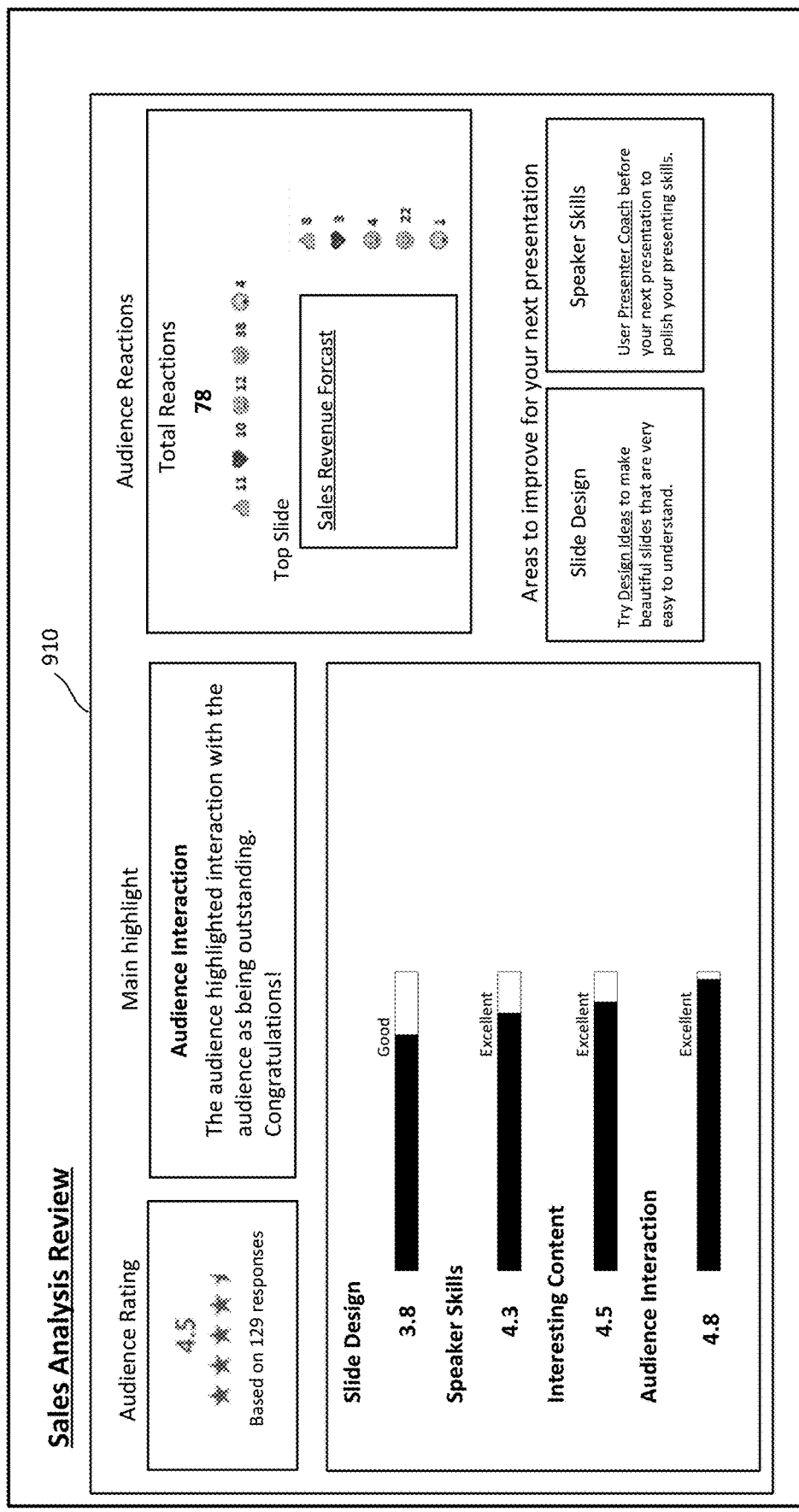
FIG. 9 is an example of an example presentation summary report that may be provided to the presenter upon completion of the presentation or online communications session.

FIG. 9 is an example of an example presentation summary report 910 that may be provided to the presenter upon completion of the presentation or online communications session. The presentation summary report may be shown to the presenter in the user interface 905 of the application. As can been seen in FIG. 9, the summary report 910 may replace the presentation content shown in the preceding examples with the summary report 910 automatically upon completion of the presentation. The feedback and reporting unit 225 may be configured to provide a summary of participant feedback to the presenter at the end of the presentation or online communications session. The presentation summary report 910 may include audience reaction information as well as presentation critiques and highlights information. The presentation summary report 910 may include information provided by the presentation coaching unit 235 based on the analysis of the presentation media streams 305 which may capture audio and/or video content of the presenter. The analyzer unit 415 of the stream processing unit 215 may analyze audio content, video content, or both provided the presenter during the online presentation or communications session. As discussed in the preceding examples, the analyzer unit 415 may output high-level features information output by the machine learning models. The feedback and reporting unit 225 may be configured to analyze these high-level features to identify presentation critiques and presentation highlights. The presentation critiques may provide information for aspects of the presenter's presentation skills that may be subject to improvement. The feedback and reporting unit 225 may also include presentation highlights which include aspects of the presenter's presentation skills which the presenter did very well. Other types of critiques, such as those described in the other examples provided herein, may also be included in the presentation summary report 910. The presentation summary report 910 may include a summary of audience reactions received during the online presentation and/or the orientation. The presentation summary report 910 may also include a live feedback score that is based on participant feedback obtained at the end of the online presentation. The feedback may be obtained by presenting the participants with user interface similar to the live polls shown in FIGS. 12A-12C which may include a series of questions asking the participant to rate various aspects of the presentation. The feedback and reporting unit 225 may be configured to collate the responses from the participants to generate the live feedback score.

Figure 10:
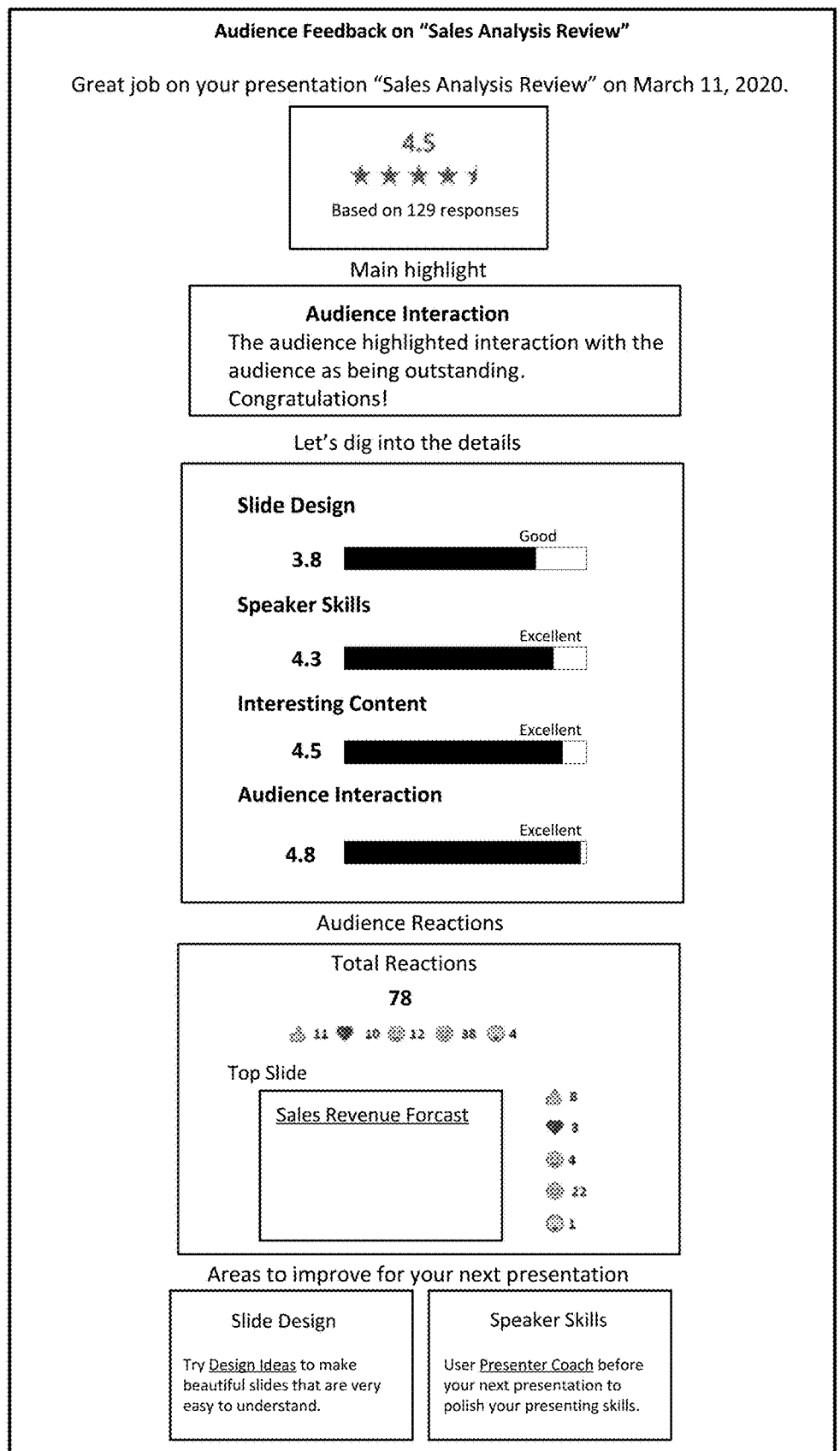
FIG. 10 is an example of another presentation summary report that may be provided to the presenter upon completion of the presentation or online communications session.

FIG. 10 is an example of another presentation summary report 1005 that may be provided to the presenter upon completion of the presentation or online communications session. The presentation summary report 1005 may include similar content as the presentation summary report 910. The presentation summary report 1005 may be sent to the presenter via email upon completion of the online presentation or communications session. The feedback and reporting unit 225 may be configured to generate the presentation summary report 1005 and to email the presentation summary report to an email address associated with the presenter. In some implementations, the feedback and reporting unit 225 may be configured to generate both the presentation summary report 910 and the presentation summary report 1005. The presentation summary report 910 may be rendered on a display of the client device 105 of the presenter upon completion of the online presentation and the presentation summary report 1005 may be emailed to the presenter.

FIG. 12A is an example of a user interface 1205 for creating a live poll that may be rendered on a display of the client devices 105 of participants of a presentation or online communications session. The content creation and editor unit 205 of the presentation and communications platform 110 may provide a user interface in which a presenter may create a live poll that may be presented to participants during an online presentation. The user interface 1205 may be rendered in the browser application 255a or the native application 250a of the client device 105a of the presenter in such implementations. The poll may also be created using an application or service that is external to the content creation and editor unit 205 and be imported into the content creation and editor unit 205. The poll may be created using a cloud-based service, such as but not limited to Microsoft Forms, which may be accessed by the browser application 255a or the native application 250a of the client device 105a of the presenter. The native application 250a of the client device 105a of the presenter may also be configured to implement a live poll.

Live polls may be used to obtain feedback regarding the presentation or communication session and/or regarding content thereof. The polls may include a question and a set of two or more answers the user may select in response to the question. Some polls may be configured to allow the user to select multiple answers. The presenter may create the poll in advance and the presentation and communications platform 110 may provide a means for launching the poll during the presentation or communication session. The content creation and editor unit 205 may be configured to allow the presenter to create new polls on the fly during the presentation or communication session. A technical benefit of this approach to polling is that it allows the presenter to engage with the participants by creating polls on the fly during the presentation.

FIG. 12B is an example of a user interface 1210 for presenting a live poll to participants of a presentation or online communications session. The poll created by the presenter using the user interface 1205 may be included in the presentation content transmitted to the client devices 105 of the participants in the presentation media streams 305. The browser application 255b or the native application 250b of the client device 105b of the participant may render the user interface 1210 on a display of the client device 105b of the participant. The participant may select an answer or answers to the poll and submit the response. The client device 105b may transmit the poll response to the presentation and communications platform 110 in the reactions data 315.

FIG. 12C is an example of a user interface 1215 for displaying results of a live poll that may be rendered on a display of the client device 105 of the presenter. The browser application 255 or the native application 250 of the client device 105 of the presenter's client device 105 may display the user interface 1215 in response to the presenter launching the live poll. The poll results provided by the participants may be collated by the presentation and communications platform 110 and the results sent in the reactions data stream 315a from the presentation and communications platform 110 to the client device 105a of the presenter. The presentation and communications platform 110 may update the poll results as additional responses are received from the participants. The poll results may also be provided to the feedback and reporting unit 225 of the presentation and communications platform 110, and the feedback and reporting unit 225 may include the poll results in the presentation summary report or reports generated at the end of the presentation and sent to the presenter.

Figure 13:
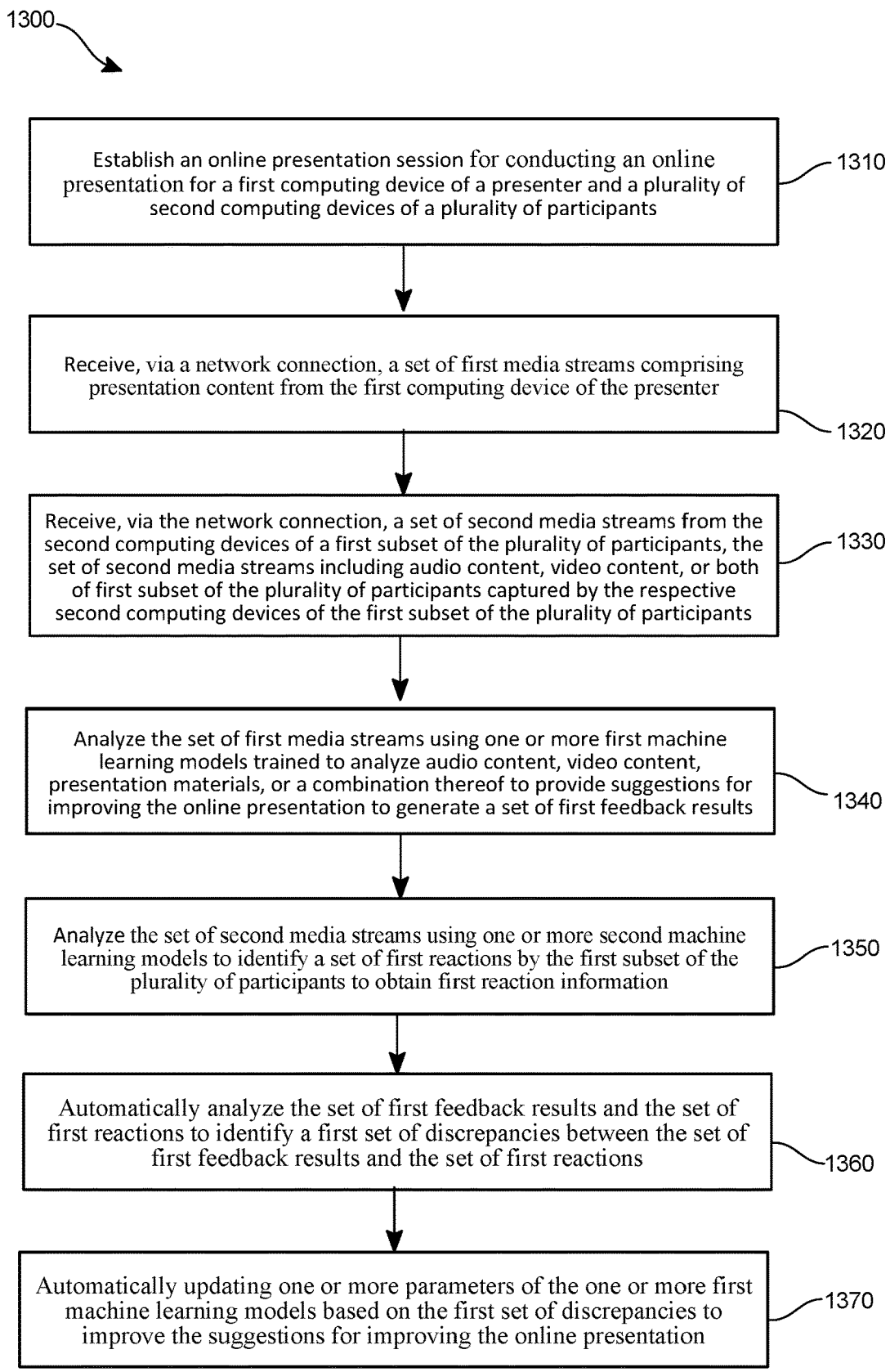
FIG. 13 is a flow chart of an example process for hosting an online presentation.

FIG. 13 is a flow chart of an example process 1300 for hosting an online presentation. The process 1300 may be implemented by the presentation and communications platform 110.

The process 1300 may include an operation 1310 of establishing an online presentation session for conducting an online presentation for a first computing device of a presenter and a plurality of second computing devices of a plurality of participants. As discussed in the preceding examples, the presentation hosting unit 240 of the presentation and communications platform 110 may receive a request from the client device 105a of the presenter to establish the online presentation session. The presenter may optionally schedule the online presentation for a future day and time or may request that the online presentation be established immediately.

The process 1300 may include an operation 1320 of receiving, via a network connection, a set for first media streams comprising presentation content from the first computing device of the presenter. The client device 105a of the presenter may transmit the presentation media streams 305a to the presentation and communications platform 110.

The process 1300 may include an operation 1330 of receiving, via the network connection, a set of second media streams from the computing devices of a first subset of the plurality of participants. The set of second media streams include video content of the first subset of the plurality of participants captured by the respective computing devices of the first subset of the plurality of participants. The second media streams may be the participant media streams 310 send by the client devices 105 of the participants to the presentation and communications platform 110. The second media streams may include video and/or audio content of the participants captured by the client devices 105 of the participants.

The process 1300 may include an operation 1340 of analyzing the set of first media streams using one or more first machine learning models trained to analyze audio content, video content, presentation materials, or a combination thereof to provide suggestions for improving the online presentation to generate a set of first feedback results.

The stream processing unit 215 of the presentation and communications platform 110 may analyze the first set of media streams using one or more machine learning models, as discussed with respect to the examples shown in FIGS. 4 and 6. The machine learning models may output high-level feature information identified in the first media streams. The high-level features may be analyzed to provide feedback to the presenter in one or more summary reports and/or to update the slide attribute model 1180 and/or the delivery attributes model 1170. The high-level feedback information may include gestures, gaze direction, emotional state, body pose, and/or other information that may indicate how the participants reacted to the online presentation.

The process 1300 may include an operation 1350 of analyzing the set of second media streams to identify a set of first reactions by the first subset of the plurality of participants to obtain first reaction information. The stream processing unit 215 of the presentation and communications platform 110 may analyze the second set of media streams using one or more machine learning models, as discussed with respect to the examples shown in FIGS. 4 and 6. The machine learning models may output high-level feature information identified in the second media streams that represent participant reactions to the online presentation. The high-level feature information may identify a gesture made by the participant, a pose of the participant, and/or other actions by the participant that may be mapped to a reaction. The high-level feature information may be mapped to a reaction by the feedback and reporting unit 225.

The process 1300 may include an operation 1360 of automatically analyzing the set of first feedback results and the set of first reactions to identify a first set of discrepancies between the set of first feedback results and the set of first reactions. The model updating unit 220 may be configured to compare the feedback results for the presenter that the slide attribute model 1180 and/or the delivery attributes model 1170 generated in response to the online presentation with the reaction information provided by the participants to the online presentation.

The process 1300 may include an operation 1370 of updating one or more parameters of the one or more first machine learning models based on the first set of discrepancies to improve the suggestions for improving the online presentation. The model updating unit 220 may be configured to update the slide attribute model 1180 and/or the delivery attributes model 1170 as discussed in the preceding examples.

The detailed examples of systems, devices, and techniques described in connection with FIGS. 1-13 and 16 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-13 and 16 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 14:
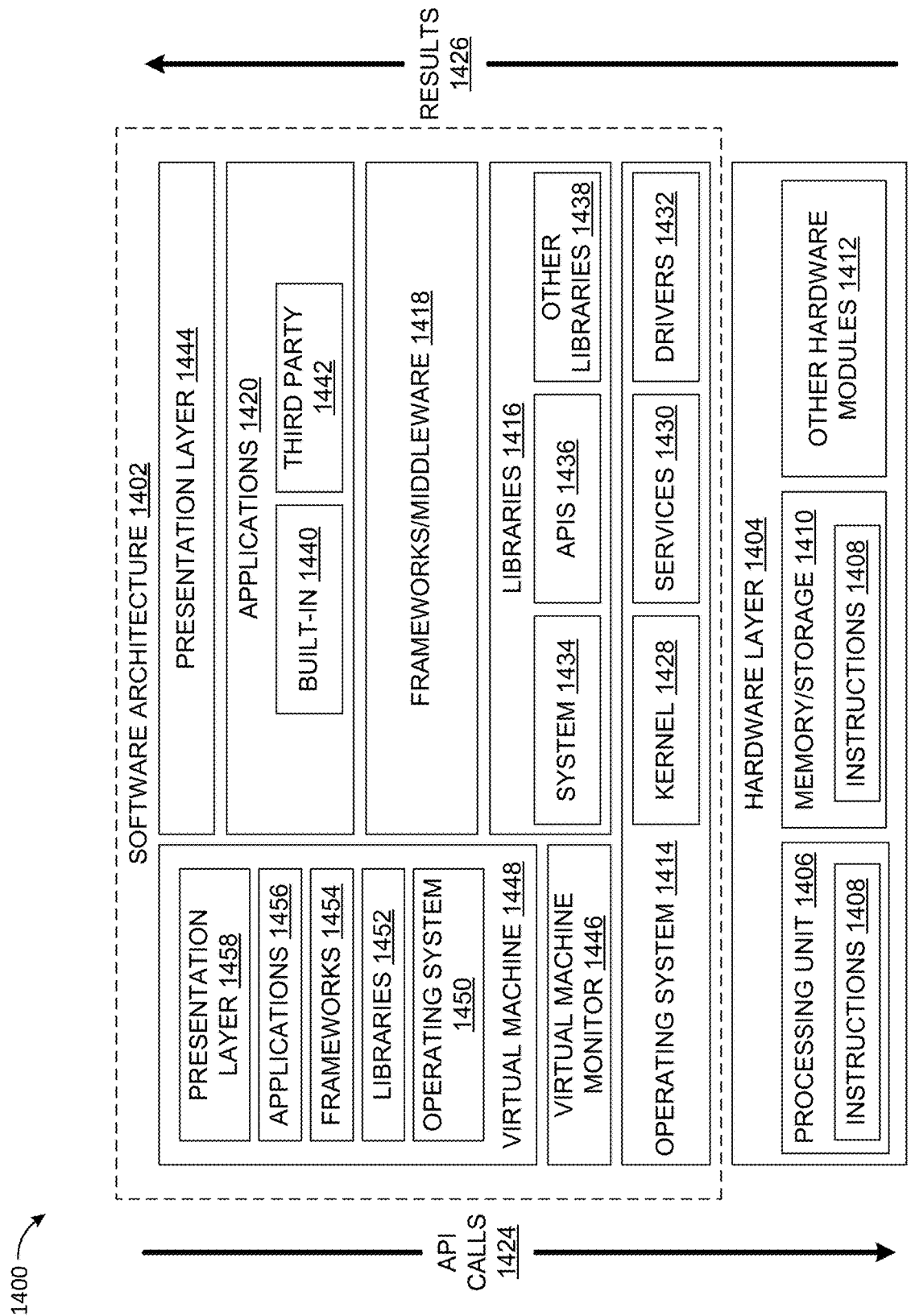
FIG. 14 is a block diagram showing an example software architecture, various portions of which may be used in conjunction with various hardware architectures herein described, which may implement any of the described features.

FIG. 14 is a block diagram 1400 illustrating an example software architecture 1402, various portions of which may be used in conjunction with various hardware architectures herein described, which may implement any of the above-described features. FIG. 14 is a non-limiting example of a software architecture and it will be appreciated that many other architectures may be implemented to facilitate the functionality described herein. The software architecture 1402 may execute on hardware such as a machine 1500 of FIG. 15 that includes, among other things, processors 1510, memory 1530, and input/output (I/O) components 1550. A representative hardware layer 1404 is illustrated and can represent, for example, the machine 1500 of FIG. 15. The representative hardware layer 1404 includes a processing unit 1406 and associated executable instructions 1408. The executable instructions 1408 represent executable instructions of the software architecture 1402, including implementation of the methods, modules and so forth described herein. The hardware layer 1404 also includes a memory/storage 1410, which also includes the executable instructions 1408 and accompanying data. The hardware layer 1404 may also include other hardware modules 1412. Instructions 1408 held by processing unit 1406 may be portions of instructions 1408 held by the memory/storage 1410.

The example software architecture 1402 may be conceptualized as layers, each providing various functionality. For example, the software architecture 1402 may include layers and components such as an operating system (OS) 1414, libraries 1416, frameworks 1418, applications 1420, and a presentation layer 1444. Operationally, the applications 1420 and/or other components within the layers may invoke API calls 1424 to other layers and receive corresponding results 1426. The layers illustrated are representative in nature and other software architectures may include additional or different layers. For example, some mobile or special purpose operating systems may not provide the frameworks/middleware 1418.

The OS 1414 may manage hardware resources and provide common services. The OS 1414 may include, for example, a kernel 1428, services 1430, and drivers 1432. The kernel 1428 may act as an abstraction layer between the hardware layer 1404 and other software layers. For example, the kernel 1428 may be responsible for memory management, processor management (for example, scheduling), component management, networking, security settings, and so on. The services 1430 may provide other common services for the other software layers. The drivers 1432 may be responsible for controlling or interfacing with the underlying hardware layer 1404. For instance, the drivers 1432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1416 may provide a common infrastructure that may be used by the applications 1420 and/or other components and/or layers. The libraries 1416 typically provide functionality for use by other software modules to perform tasks, rather than interacting directly with the OS 1414. The libraries 1416 may include system libraries 1434 (for example, C standard library) that may provide functions such as memory allocation, string manipulation, file operations. In addition, the libraries 1416 may include API libraries 1436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1416 may also include a wide variety of other libraries 1438 to provide many functions for applications 1420 and other software modules.

The frameworks 1418 (also sometimes referred to as middleware) provide a higher-level common infrastructure that may be used by the applications 1420 and/or other software modules. For example, the frameworks 1418 may provide various graphic user interface (GUI) functions, high-level resource management, or high-level location services. The frameworks 1418 may provide a broad spectrum of other APIs for applications 1420 and/or other software modules.

The applications 1420 include built-in applications 1440 and/or third-party applications 1442. Examples of built-in applications 1440 may include, but are not limited to, a contacts application, a browser application, a location application, a media application, a messaging application, and/or a game application. Third-party applications 1442 may include any applications developed by an entity other than the vendor of the particular platform. The applications 1420 may use functions available via OS 1414, libraries 1416, frameworks 1418, and presentation layer 1444 to create user interfaces to interact with users.

Some software architectures use virtual machines, as illustrated by a virtual machine 1448. The virtual machine 1448 provides an execution environment where applications/modules can execute as if they were executing on a hardware machine (such as the machine 1500 of FIG. 15, for example). The virtual machine 1448 may be hosted by a host OS (for example, OS 1414) or hypervisor, and may have a virtual machine monitor 1446 which manages operation of the virtual machine 1448 and interoperation with the host operating system. A software architecture, which may be different from software architecture 1402 outside of the virtual machine, executes within the virtual machine 1448 such as an OS 1450, libraries 1452, frameworks 1454, applications 1456, and/or a presentation layer 1458.

Figure 15:
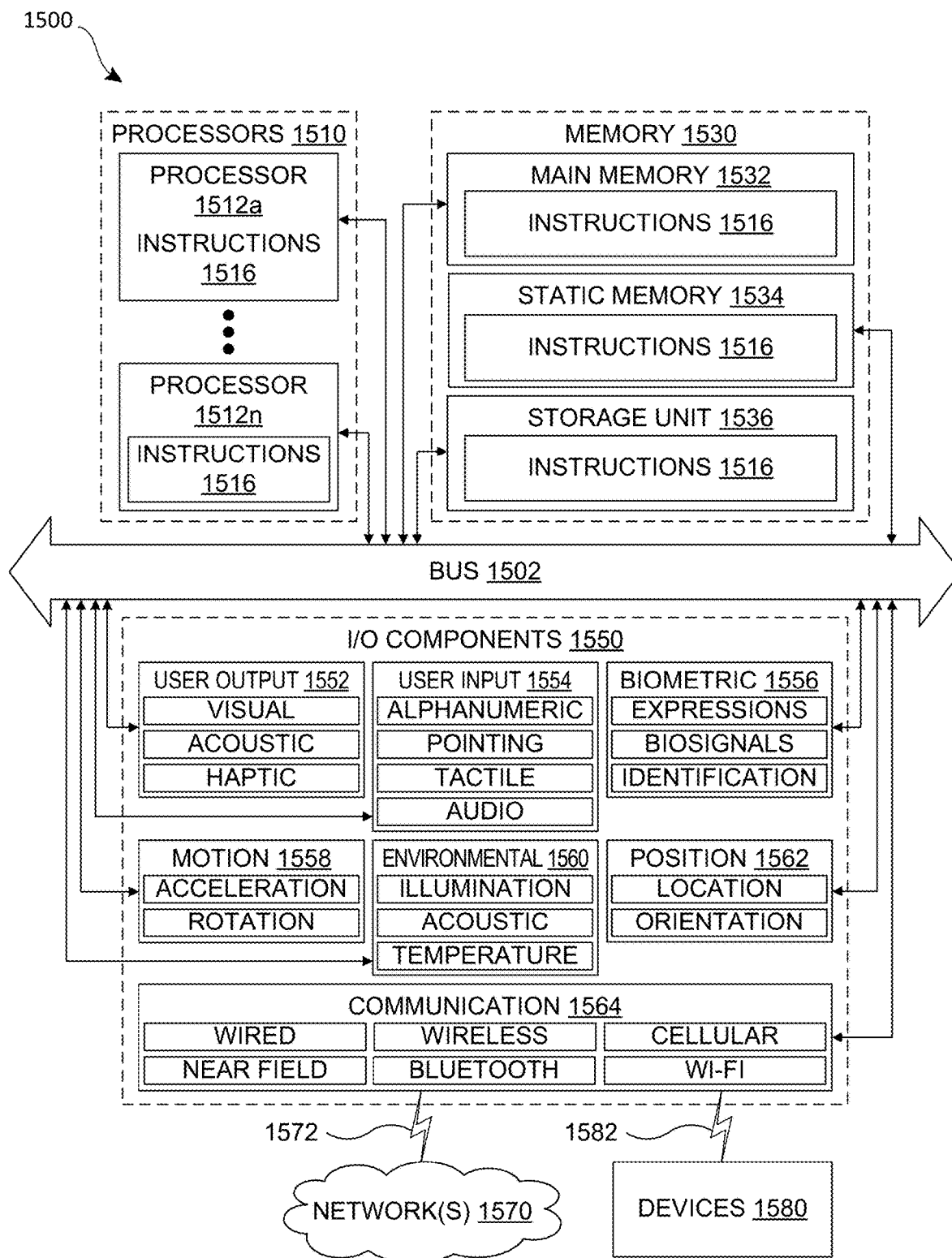
FIG. 15 is a block diagram showing components of an example machine configured to read instructions from a machine-readable medium and perform any of the features described herein.

FIG. 15 is a block diagram illustrating components of an example machine 1500 configured to read instructions from a machine-readable medium (for example, a machine-readable storage medium) and perform any of the features described herein. The example machine 1500 is in a form of a computer system, within which instructions 1516 (for example, in the form of software components) for causing the machine 1500 to perform any of the features described herein may be executed. As such, the instructions 1516 may be used to implement modules or components described herein. The instructions 1516 cause unprogrammed and/or unconfigured machine 1500 to operate as a particular machine configured to carry out the described features. The machine 1500 may be configured to operate as a standalone device or may be coupled (for example, networked) to other machines. In a networked deployment, the machine 1500 may operate in the capacity of a server machine or a client machine in a server-client network environment, or as a node in a peer-to-peer or distributed network environment. Machine 1500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1500 is illustrated, the term "machine" includes a collection of machines that individually or jointly execute the instructions 1516.

The machine 1500 may include processors 1510, memory 1530, and I/O components 1550, which may be communicatively coupled via, for example, a bus 1502. The bus 1502 may include multiple buses coupling various elements of machine 1500 via various bus technologies and protocols. In an example, the processors 1510 (including, for example, a central processing unit (CPU), a graphics processing unit (GPU), a digital signal processor (DSP), an ASIC, or a suitable combination thereof) may include one or more processors $1512a$ to $1512n$ that may execute the instructions 1516 and process data. In some examples, one or more processors 1510 may execute instructions provided or identified by one or more other processors 1510. The term "processor" includes a multi-core processor including cores that may execute instructions contemporaneously. Although FIG. 15 shows multiple processors, the machine 1500 may include a single processor with a single core, a single processor with multiple cores (for example, a multi-core processor), multiple processors each with a single core, multiple processors each with multiple cores, or any combination thereof. In some examples, the machine 1500 may include multiple processors distributed among multiple machines.

The memory/storage 1530 may include a main memory 1532, a static memory 1534, or other memory, and a storage unit 1536, both accessible to the processors 1510 such as via the bus 1502. The storage unit 1536 and memory 1532, 1534 store instructions 1516 embodying any one or more of the functions described herein. The memory/storage 1530 may also store temporary, intermediate, and/or long-term data for processors 1510. The instructions 1516 may also reside, completely or partially, within the memory 1532, 1534, within the storage unit 1536, within at least one of the processors 1510 (for example, within a command buffer or cache memory), within memory at least one of I/O components 1550, or any suitable combination thereof, during execution thereof. Accordingly, the memory 1532, 1534, the storage unit 1536, memory in processors 1510, and memory in I/O components 1550 are examples of machine-readable media.

As used herein, "machine-readable medium" refers to a device able to temporarily or permanently store instructions and data that cause machine 1500 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1516) for execution by a machine 1500 such that the instructions, when executed by one or more processors 1510 of the machine 1500, cause the machine 1500 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1550 may include a wide variety of hardware components adapted to receive input, provide output, produce output, transmit information, exchange information, capture measurements, and so on. The specific I/O components 1550 included in a particular machine will depend on the type and/or function of the machine. For example, mobile devices such as mobile phones may include a touch input device, whereas a headless server or IoT device may not include such a touch input device. The particular examples of I/O components illustrated in FIG. 15 are in no way limiting, and other types of components may be included in machine 1500. The grouping of I/O components 1550 are merely for simplifying this discussion, and the grouping is in no way limiting. In various examples, the I/O components 1550 may include user output components 1552 and user input components 1554. User output components 1552 may include, for example, display components for displaying information (for example, a liquid crystal display (LCD) or a projector), acoustic components (for example, speakers), haptic components (for example, a vibratory motor or force-feedback device), and/or other signal generators. User input components 1554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1550 may include biometric components 1556, motion components 1558, environmental components 1560, and/or position components 1562, among a wide array of other physical sensor components. The biometric components 1556 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1558 may include, for example, acceleration sensors (for example, an accelerometer) and rotation sensors (for example, a gyroscope). The environmental components 1560 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1562 may include, for example, location sensors (for example, a Global Position System (GPS) receiver), altitude sensors (for example, an air pressure sensor from which altitude may be derived), and/or orientation sensors (for example, magnetometers).

The I/O components 1550 may include communication components 1564, implementing a wide variety of technologies operable to couple the machine 1500 to network(s) 1570 and/or device(s) 1580 via respective communicative couplings 1572 and 1582. The communication components 1564 may include one or more network interface components or other suitable devices to interface with the network(s) 1570. The communication components 1564 may include, for example, components adapted to provide wired communication, wireless communication, cellular communication, Near Field Communication (NFC), Bluetooth communication, Wi-Fi, and/or communication via other modalities. The device(s) 1580 may include other machines or various peripheral devices (for example, coupled via USB).

In some examples, the communication components 1564 may detect identifiers or include components adapted to detect identifiers. For example, the communication components 1564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1562, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a computer-readable medium storing executable instructions that, when executed, cause the processor to perform operations comprising:
   establishing an online presentation session for conducting an online presentation for a first computing device of a presenter and a plurality of second computing devices of a plurality of participants;
   receiving, via a network connection, a set of first media streams comprising presentation content from the first computing device of the presenter;
   receiving, via the network connection, a set of second media streams from the second computing devices of a first subset of the plurality of participants, the set of second media streams including audio content, video content, or both of a first subset of the plurality of participants captured by the respective second computing devices of the first subset of the plurality of participants;
   analyzing the set of first media streams using one or more first machine learning models trained to analyze audio content, video content, presentation materials, or a combination thereof to provide suggestions for improving the online presentation to generate a set of first feedback results;
   analyzing the set of second media streams with one or more feature extraction tools to generate first extracted features from the set of second media streams;
   invoking one or more second machine learning models with the first extracted features as an input to obtain intermediate reaction information;
   analyzing the intermediate reaction information using one or more high-level feature extraction models to obtain first high-level feature information representing a set of first reactions by the first subset of the plurality of participants;
   automatically analyzing the set of first feedback results and the set of first reactions to identify a first set of discrepancies between the set of first feedback results and the set of first reactions; and
   automatically updating the one or more first machine learning models based on the first set of discrepancies to improve the suggestions for improving the online presentation.

2. The data processing system of claim 1, wherein to analyze the set of first media streams using one or more first machine learning models, the computer-readable medium includes instructions to cause the processor to perform operations of:
   analyzing the set of first media streams with the one or more feature extraction tools to generate second extracted features associated with presenter actions during the online presentation; and
   invoking the one or more second machine learning models with the second extracted features as an input to the one or more second machine learning models to obtain first intermediate presenter action information.

3. The data processing system of claim 2, further comprising instructions configured to cause the processor to perform operations of:
   analyzing the first intermediate presenter action information using the one or more high-level feature extraction models to obtain second high-level feature information representing one or more actions representing actions performed by the presenter during the online presentation.

4. The data processing system of claim 1, wherein the one or more first machine learning models are explainable machine learning models.

5. The data processing system of claim 4, wherein the explainable machine learning models are gradient boosted trees.

6. A method implemented in a data processing system for facilitating an online presentation session, the method comprising:
   establishing the online presentation session for a first computing device of a presenter and a plurality of second computing devices of a plurality of participants;
   receiving, via a network connection, a set of first media streams comprising presentation content from the first computing device of the presenter;
   receiving, via the network connection, a set of second media streams from the second computing devices of a first subset of the plurality of participants, the set of second media streams including audio content, video content, or both of a first subset of the plurality of participants captured by the respective second computing devices of the first subset of the plurality of participants;

analyzing the set of first media streams using one or more first machine learning models trained to analyze audio content, video content, presentation materials, or a combination thereof to provide suggestions for improving the online presentation to generate a set of first feedback results;

analyzing the set of second media streams with one or more feature extraction tools to generate first extracted features from the set of second media streams;

invoking one or more second machine learning models with the first extracted features as an input to obtain intermediate reaction information;

analyzing the intermediate reaction information using one or more high-level feature extraction models to obtain first high-level feature information representing a set of first reactions by the first subset of the plurality of participants;

automatically analyzing the set of first feedback results and the set of first reactions to identify a first set of discrepancies between the set of first feedback results and the set of first reactions; and automatically updating the one or more first machine learning models based on the first set of discrepancies to improve the suggestions for improving the online presentation.

7. The method of claim 6, wherein analyzing the set of first media streams using one or more first machine learning models further comprising:

analyzing the set of first media streams with the one or more feature extraction tools to generate second extracted features associated with presenter actions during the online presentation; and invoking the one or more second machine learning models with the second extracted features as an input to the one or more second machine learning models to obtain first intermediate presenter action information.

8. The method of claim 7, further comprising:

analyzing the first intermediate presenter action information using the one or more high-level feature extraction models to obtain second high-level feature information representing one or more actions representing actions performed by the presenter during the online presentation.

9. The method of claim 6, wherein the one or more first machine learning models are explainable machine learning models.

10. A machine-readable medium on which are stored instructions that, when executed, cause a processor of a programmable device to perform functions of:

establishing an online presentation session for conducting an online presentation for a first computing device of a presenter and a plurality of second computing devices of a plurality of participants;

receiving, via a network connection, a set of first media streams comprising presentation content from the first computing device of the presenter;

receiving, via the network connection, a set of second media streams from the second computing devices of a first subset of the plurality of participants, the set of second media streams including audio content, video content, or both of a first subset of the plurality of participants captured by the respective second computing devices of the first subset of the plurality of participants;

analyzing the set of first media streams using one or more first machine learning models trained to analyze audio content, video content, presentation materials, or a combination thereof to provide suggestions for improving the online presentation to generate a set of first feedback results;

analyzing the set of second media streams with one or more feature extraction tools to generate first extracted features from the set of second media streams;

invoking one or more second machine learning models with the first extracted features as an input to obtain intermediate reaction information;

analyzing the intermediate reaction information using one or more high-level feature extraction models to obtain first high-level feature information representing a set of first reactions by the first subset of the plurality of participants;

automatically analyzing the set of first feedback results and the set of first reactions to identify a first set of discrepancies between the set of first feedback results and the set of first reactions; and automatically updating the one or more first machine learning models based on the first set of discrepancies to improve the suggestions for improving the online presentation.

11. The machine-readable medium of claim 10, wherein, to analyze the set of first media streams using one or more first machine learning models, the machine-readable medium includes instructions to cause the processor to perform operations of:

analyzing the set of first media streams with the one or more feature extraction tools to generate second extracted features associated with presenter actions during the online presentation; and invoking the one or more second machine learning models with the second extracted features as an input to the one or more second machine learning models to obtain first intermediate presenter action information.

12. The machine-readable medium of claim 11, further comprising instructions configured to cause the processor to perform operations of:

analyzing the first intermediate presenter action information using the one or more high-level feature extraction models to obtain second high-level feature information representing one or more actions representing actions performed by the presenter during the online presentation.

13. The machine-readable medium of claim 10, wherein the one or more first machine learning models are explainable machine learning models.

14. The machine-readable medium of claim 13, wherein the explainable machine learning models are gradient boosted trees.

* * * * *